(12) United States Patent
Motosugi et al.

(10) Patent No.: US 12,035,040 B2
(45) Date of Patent: Jul. 9, 2024

(54) COLLATION DEVICE AND NON-TRANSITORY COMPUTER READABLE MEDIUM STORING PROGRAM

(71) Applicant: FUJIFILM Business Innovation Corp., Tokyo (JP)

(72) Inventors: Yukari Motosugi, Kanagawa (JP); Nobuhiro Kitagawa, Kanagawa (JP); Kazuhiro Hirata, Kanagawa (JP); Shigeru Yamamoto, Kanagawa (JP); Masahiro Igusa, Kanagawa (JP); Minoru Oshima, Kanagawa (JP); Tetsuya Kimura, Kanagawa (JP); Momoko Fujiwara, Tokyo (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 27 days.

(21) Appl. No.: 17/897,204

(22) Filed: Aug. 28, 2022

(65) Prior Publication Data
US 2023/0118236 A1    Apr. 20, 2023

(30) Foreign Application Priority Data

Oct. 20, 2021  (JP) ................................. 2021-171960
Jun. 7, 2022  (JP) ................................. 2022-092360

(51) Int. Cl.
*H04N 23/00*    (2023.01)
*G06T 7/70*     (2017.01)
(Continued)

(52) U.S. Cl.
CPC .............. *H04N 23/64* (2023.01); *G06T 7/70* (2017.01); *H04N 23/56* (2023.01); *H04N 23/635* (2023.01); *H04N 23/80* (2023.01)

(58) Field of Classification Search
CPC ...... H04N 23/64; H04N 23/56; H04N 23/635; H04N 23/80; H04N 23/61; H04N 23/633;
(Continued)

(56) References Cited

U.S. PATENT DOCUMENTS 4,398,811 A * 8/1983 Nishioka ............ G02B 23/2407
                                              385/117
4,622,954 A * 11/1986 Arakawa .............. A61B 1/0051
                                              600/153
(Continued)

FOREIGN PATENT DOCUMENTS

EP          2956915         12/2018
JP        2015008374         1/2015
(Continued)

OTHER PUBLICATIONS

"Search Report of Europe Counterpart Application", issued on Mar. 14, 2023, p. 1-p. 9.
(Continued)

*Primary Examiner* — Frank F Huang
(74) *Attorney, Agent, or Firm* — JCIPRNET

(57) ABSTRACT

A collation device includes a light source unit; a camera unit that receives light emitted from the light source unit and reflected in a collation area of an object to acquire a photographed image of the collation area; and a processor configured to, by executing a program: detect a positional relationship between the light source unit and the camera unit by using the photographed image, and notify of a collation result between the photographed image and a registered image prepared in advance by using the positional relationship.

21 Claims, 19 Drawing Sheets

(51) Int. Cl.
*H04N 23/56* (2023.01)
*H04N 23/60* (2023.01)
*H04N 23/63* (2023.01)
*H04N 23/80* (2023.01)

(58) Field of Classification Search
CPC ... G06T 7/70; G06T 2207/20061; G06T 7/11; G06T 7/136; G06K 19/06065; G06K 19/06112; G06K 19/06131; G06K 19/086; G06V 10/245; G06V 10/28; G06V 10/44; G06V 10/56; G06V 10/60; G06V 20/80; G06V 20/95; G07D 7/003; G07D 7/0043; G07D 7/2008; G07D 7/2033

See application file for complete search history.

(56) References Cited

U.S. PATENT DOCUMENTS

| | | | | |
|---|---|---|---|---|
| 4,905,082 | A * | 2/1990 | Nishigaki | A61B 1/07 600/109 |
| 5,557,454 | A * | 9/1996 | Takahashi | G02B 23/2415 348/45 |
| 6,025,873 | A * | 2/2000 | Nishioka | G02B 23/26 600/181 |
| 6,362,877 | B1 * | 3/2002 | Kobayashi | G01R 31/281 356/614 |
| 6,537,208 | B1 * | 3/2003 | Konno | H04N 5/2253 348/340 |
| 10,510,203 | B2 | 12/2019 | Masuda et al. | |
| 10,538,122 | B2 | 1/2020 | Okada et al. | |
| 2002/0163742 | A1 * | 11/2002 | Togino | G02B 17/02 359/837 |
| 2003/0097044 | A1 * | 5/2003 | Rovegno | A61B 1/07 600/173 |
| 2005/0085698 | A1 * | 4/2005 | Bonningue | A61B 1/00183 600/129 |
| 2005/0197533 | A1 * | 9/2005 | May | A61B 1/042 600/137 |
| 2009/0292170 | A1 * | 11/2009 | Boebel | G02B 23/2415 600/111 |
| 2014/0071444 | A1 * | 3/2014 | Matsumoto | G01N 21/954 356/241.1 |
| 2016/0255324 | A1 * | 9/2016 | Kazakevich | G02B 23/2484 348/43 |
| 2016/0357007 | A1 * | 12/2016 | Swanson | G02B 23/26 |
| 2017/0287147 | A1 | 10/2017 | Takahashi et al. | |
| 2018/0144160 | A1 | 5/2018 | Shirakura | |
| 2018/0367786 | A1 * | 12/2018 | Furst | A61B 1/00096 |
| 2020/0134343 | A1 | 4/2020 | Yamaoka et al. | |
| 2021/0183049 | A1 | 6/2021 | Di Venuto Dayer, V et al. | |

FOREIGN PATENT DOCUMENTS

| | | |
|---|---|---|
| JP | 6098759 | 3/2017 |
| JP | 6156586 | 7/2017 |
| JP | 6206645 | 10/2017 |
| JP | 2019074778 | 5/2019 |
| WO | 2017010460 | 1/2017 |
| WO | 2018126031 | 7/2018 |

OTHER PUBLICATIONS

"Office Action of Europe Counterpart Application", issued on Oct. 31, 2023, p. 1-p. 4.

* cited by examiner

COLLATION DEVICE AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2021-171960 filed Oct. 20, 2021 and No. 2022-092360 filed Jun. 7, 2022.

BACKGROUND

(i) Technical Field

The present invention relates to a collation device and a non-transitory computer readable medium storing a program.

(ii) Related Art

JP2015-008374A discloses a mobile terminal that acquires a photographed image for extracting the same feature point by using a camera included in the mobile terminal. The mobile terminal includes a light source unit, a camera unit, a display unit, and a control unit that, in a case where photographing a collation area of an object with a satin pattern, superimposes and displays a reference image for photographing the collation area in a state where a relative position and posture of the light source unit, the camera unit, and the collation area satisfy a predetermined relationship on a through image displayed on the display unit.

JP2019-074778A discloses a reading method capable of reading information on an information recording medium by using a simple reading device such as a portable information terminal without searching for an imaging angle. In the method of reading information by imaging an information recording medium having a structure that emits return light which is an authenticity determination target, by using a portable information terminal equipped with an imaging element and a display screen on the same surface, as means for illuminating the structure, an operation of acquiring information on the structure is performed by imaging the structure illuminated by an illumination pattern displayed at a certain position of the display screen with the imaging element. In a case where the information is acquired, the process ends, and in a case where the information is not acquired, the illumination pattern is displayed at another position of the display screen, and the information of the information recording medium is acquired by repeating a series of operations until the information on the structure is acquired.

SUMMARY

In a case where a user photographs a collation area by using a mobile terminal and collates the image with a registered image registered in advance, since a relative positional relationship between a light source and a camera of the mobile terminal differs for each model of the mobile terminal, the photographed image of the collation area differs, and it becomes difficult to collate the photographed image with the registered image.

Aspects of non-limiting embodiments of the present disclosure relate to a collation device and a non-transitory computer readable medium storing a program that provide a device capable of photographing a collation area and collating the image with a registered image without preparing a registered image for each model of a mobile terminal.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a collation device including a light source unit; a camera unit that receives light emitted from the light source unit and reflected in a collation area of an object to acquire a photographed image of the collation area; and a processor configured to, by executing a program: detect a positional relationship between the light source unit and the camera unit by using the photographed image, and notify of a collation result between the photographed image and a registered image prepared in advance by using the positional relationship.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the present invention will be described with reference to the drawings. An individual identification system that uniquely identifies an object by photographing a surface image of the object and performing image collation between a registered image and a collation image will be described as an example.

The individual identification system is a technology that registers an image of a part of a surface of an object, specifically about 0.1 to several mm in advance as information unique to the object and uniquely identifies that the object to be collated is the same as a registered object, that is, the object is genuine, and the information unique to the object is, for example, a random pattern by a fine pattern. A satin pattern is a specific example of the random pattern by the fine pattern. The satin pattern is not limited to a surface treatment such as frosted glass, and is a concept that includes not only the satin pattern applied by treatment processing to metal or synthetic resin (plastic or the like), but also a wrinkle pattern obtained by embossing treatment and randomly woven fiber pattern, a random fine dot pattern by printing, and a random particle distribution by printing with ink containing glitter particles. Further, the satin pattern includes not only an unintentionally formed satin pattern but also an intentionally formed satin pattern for identification or collation. In short, the satin pattern is a random pattern that is difficult to control and form. It may be said to be a kind of "artifact metrics" that optically reads such a random pattern and uses the random pattern as information.

Here, a case is assumed in which a printing substrate having unevenness such as a hologram and paper is used as a printing substrate and an ink portion in which metal particles are dispersed is printed on the printing substrate having such unevenness to form a random pattern.

Figure 1:
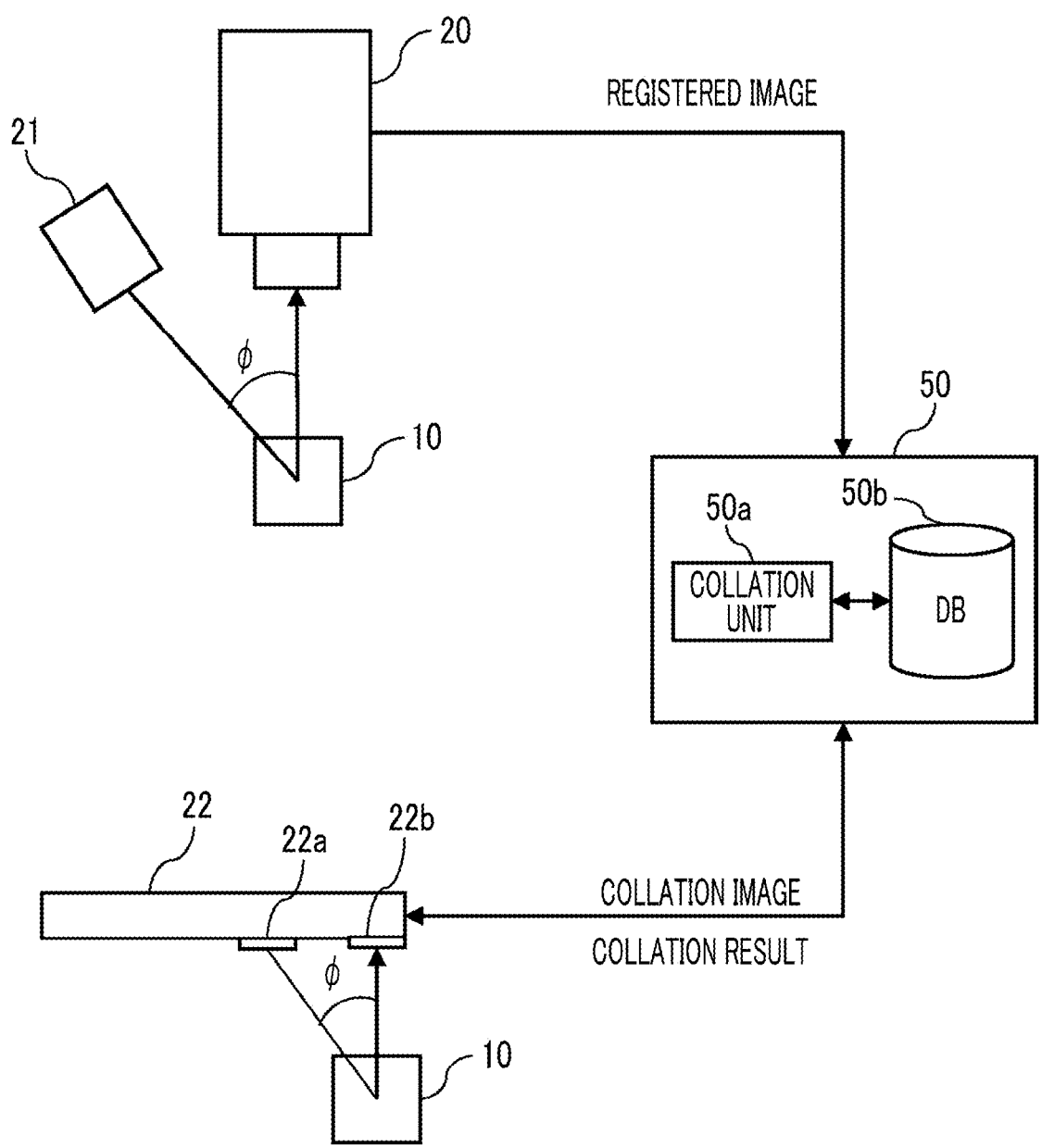
FIG. 1 is a system configuration diagram of an exemplary embodiment.

FIG. 1 shows a system configuration of the present exemplary embodiment. The collation system includes a registered image photographing machine 20, a collation image photographing machine 22, and a server computer 50. The registered image photographing machine 20 and the server computer 50, and the collation image photographing machine 22 and the server computer 50 are connected to each other by a communication network.

An object 10 is irradiated with a light source unit 21 such as an LED, and light reflected from the object 10 is photographed by the registered image photographing machine 20 to acquire a registered image. The registered image photographing machine 20 and the light source unit 21 can be composed of dedicated equipment for registration.

An irradiation angle φ of the irradiation light from the light source unit 21 is set to a certain fixed angle. The acquired registered image is transmitted to the server computer 50 and stored in a registered image DB 50b in the server computer 50.

On the other hand, the object 10 is photographed by using a mobile terminal such as a smartphone grasped by the user of the collation system as the collation image photographing machine 22. The object 10 is irradiated with a light source unit 22a such as an LED mounted on a smartphone or the like, and the light reflected from the object 10 is photographed by the camera unit 22b mounted on the smartphone or the like. An irradiation angle φ of the irradiation light from the light source unit 22a is set to be substantially the same as an angle φ which is the condition in a case where the registered image is acquired. The reason is that, as described above, the random pattern of the ink portion changes depending on an irradiation direction of light, so that, it is necessary to set a positional relationship between the light source unit 22a, the camera unit 22b, and the object 10 to be substantially the same as a positional relationship at the time of photographing the registered image 16.

Note that, the angle on a plane of light emitted from the light source unit 21 to the object 10 and the angle on a plane of light emitted from the light source unit 22a to the object 10 is set substantially the same. The angle on the plane (or the irradiation direction of light on the plane) will be further described later.

A processor of the collation image photographing machine 22 performs a series of processing on the photographed image to extract the ink portion from the photographed image, further cuts out the collation image as a collation area from the area of the ink portion, and transmits the collation image to the server computer 50 through the communication network. The processing of the processor of the collation image photographing machine 22 will be further described later.

The server computer 50 includes a collation unit 50a and the registered image DB 50b.

The registered image DB 50b is composed of a storage device such as a hard disk or a solid state drive (SSD), and stores an identifier ID for uniquely specifying the object 10 and the registered image in association with each other.

The collation unit 50a is composed of a processor, and stores the registered image received from the registered image photographing machine 20 in the registered image DB 50b in association with the ID of the object 10. Further, the collation unit 50a performs image collation between the collation image received from the collation image photographing machine 22 and the registered image stored in the registered image DB 50b, and outputs the collation result to the collation image photographing machine 22. Specifically, the collation unit 50a reads the registered image from the registered image DB 50b, performs collation calculation with the collation image, and calculates the degree of similarity between the two images. A known algorithm can be used for the degree of similarity. The calculated degree of similarity is compared with a threshold, and in a case where the degree of similarity exceeds the threshold, it is determined that the both match, and in a case where the degree of similarity does not exceed the threshold, it is determined that the both do not match. The collation unit 50a transmits the collation result to the collation image photographing machine 22 through the communication network.

In the image collation, there is an error rate due to fluctuations in the input of the registered image photographing machine 20 or the collation image photographing machine 22 to an image sensor, quantization error, and the like. The error rate consists of two, a false rejection rate, which is the probability of determining false even though it is true, and a false acceptance rate, which is the probability of determining true even though it is false. The two are in a trade-off relationship, and in a case where one decreases, the other increases. Therefore, a threshold is set so that the loss in the application target of the collation determination is the smallest.

Note that a plurality of the registered images may be acquired by changing the irradiation direction of light and registered in the registered image DB 50b of the server computer 50, and the image collation between the plurality of registered images and the collation image may be performed. At that time, the irradiation direction of light may be specified from a bright spot detected from the collation image or brightness distribution of the collation image, and of the plurality of registered images, a registered image photographed in the same irradiation direction as the irradiation direction of light specified from the collation image may be used. Further, in a case where the bright spot cannot be detected from the collation image, the irradiation direction of light may be specified by using the brightness distribution of the collation image.

Figure 2:
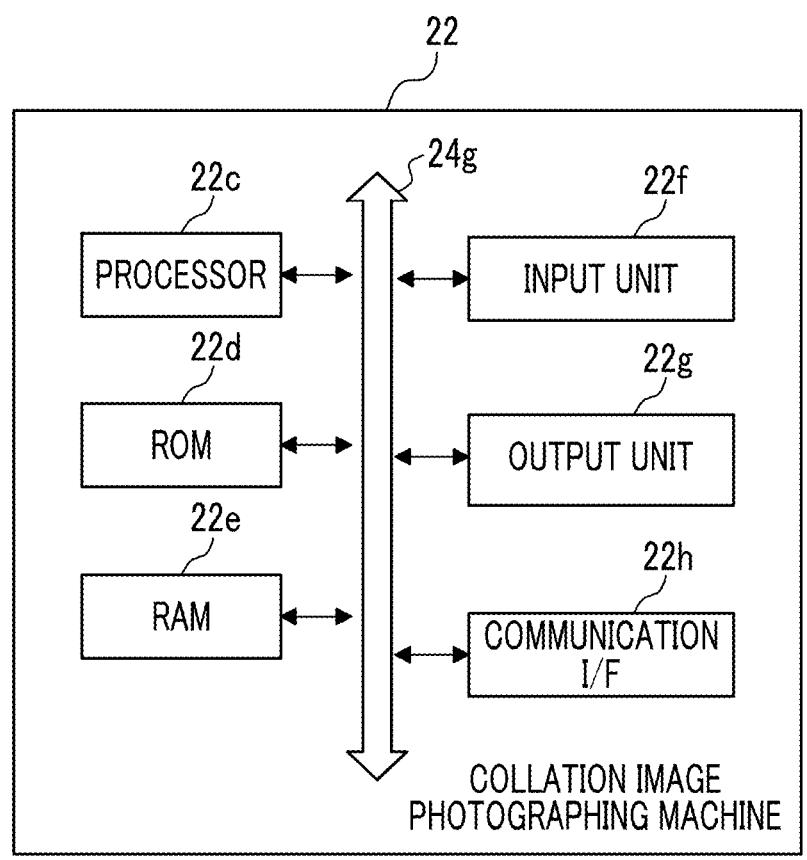
FIG. 2 is a configuration block diagram of a collation image photographing machine of an exemplary embodiment.

FIG. 2 shows a block diagram of a main configuration of a collation image photographing machine 22 such as a smartphone. The collation image photographing machine 22 includes a processor 22c, a ROM 22d, a RAM 22e, an input unit 22f, an output unit 22g, and a communication I/F 22h in addition to the light source unit 22a and the camera unit 22b described above.

The processor 22c reads out an application program stored in the ROM 22d, executes a series of processing using the RAM 22e as a working memory, extracts the ink portion from the photographed image photographed by the camera unit 22b, and further cuts out the collation image. The processor 22c transmits the cut-out collation image to the server computer 50 through the communication I/F 22h. Further, the processor 22c receives the collation result from the server computer 50 through the communication I/F 22h.

The input unit 22f is composed of a keyboard, a touch switch, or the like, and the user operates the input unit 22f to start the application program.

The output unit 22g is composed of a liquid crystal display, an organic EL display, or the like and functions as a display unit, and displays a preview image in a case where the object 10 is photographed. Further, the output unit 22g displays a guide in a case where photographing the object 10 by a control command from the processor 22c. The guide will be further described later. Further, the output unit 22g displays the collation result received from the server computer 50 by the control command from the processor 22c. The collation result is either "match" or "mismatch", but other messages related to the collation may be displayed.

Figure 3A:
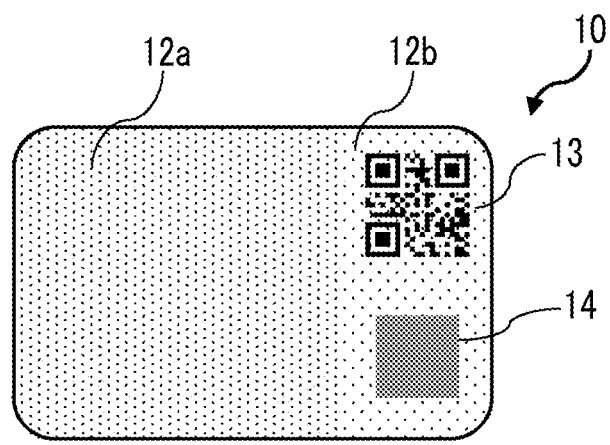
FIGS. 3A and 3B are plan diagrams of an object including a hologram portion and an object of paper of an exemplary embodiment.
Figure 3B:
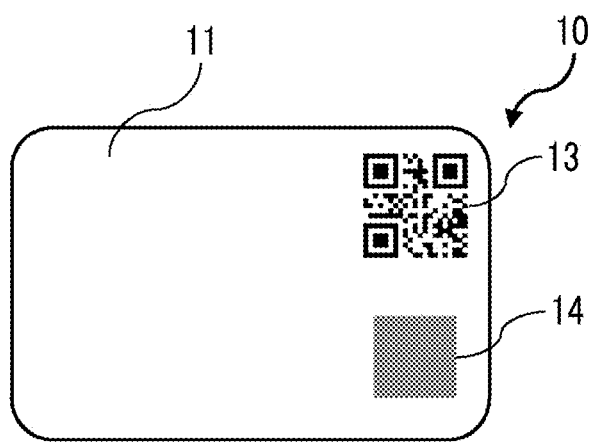

FIGS. 3A and 3B show plan diagrams of the object 10 in the present exemplary embodiment. FIG. 3A shows a case where a hologram label seal is used as the object 10. The hologram label seal includes hologram portions 12a and 12b, a QR code 13, and an ink portion 14.

The hologram portion 12a is formed substantially on a left half of the label seal and forms a hologram pattern.

A hologram portion 12b is formed substantially on a right half of the label seal and is subjected to satin treatment, so that color development of a rainbow color is changed depending on an elevation angle. Here, the "elevation angle" means an angle formed by a light source 22a, the object 10, and the camera unit 22b in FIG. 1. For example, it is desirable that the elevation angle matches an angle φ in FIG. 1.

The QR code 13 is formed on the satin-treated hologram portion 12b. For the QR code 13, various information about the label seal is printed as a QR code. Further, in the present exemplary embodiment, the QR code 13 is printed with the relative positional relationship fixed in advance with respect to the ink portion 14. Therefore, the QR code 13 can also function as a positioning mark for extracting the ink portion 14.

The ink portion 14 is gravure-printed with gravure ink containing silver particles on the satin-treated hologram portion 12b to form a polygonal shape. In the figure, the ink portion 14 is printed in a square shape at a lower part of the QR code 13 at a fixed interval. The ink portion 14 is a random pattern area, which is a collation area to be photographed and extracted by the collation image photographing machine 22. The shape of the ink portion 14 may be an ellipse (including a circle) as well as a polygon.

FIG. 3B shows a case where a paper label seal is used as another object 10. The paper label seal includes a paper portion 11, the QR code 13, and the ink portion 14.

The QR code 13 is formed on the paper portion 11. For the QR code 13, various information about the label seal is printed as a QR code. The QR code 13 is printed with the relative positional relationship with respect to the ink portion 14 fixed in advance. Therefore, the QR code 13 can also function as a positioning mark for extracting the ink portion 14.

The ink portion 14 is toner-printed on the paper portion 11 with toner ink containing silver particles to form a polygonal shape. In the figure, the ink portion 14 is printed in a square shape at a lower part of the QR code 13 at a fixed interval. The ink portion 14 is a random pattern area, which is a collation area to be photographed and extracted by the collation image photographing machine 22.

Figure 4:
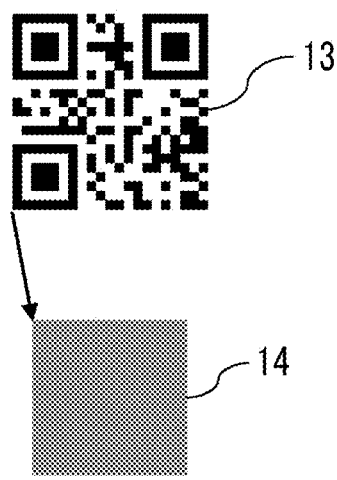
FIG. 4 is an explanatory diagram showing a relative positional relationship between a QR code (registered trademark) and an ink portion of an exemplary embodiment.

FIG. 4 schematically shows position specifying processing of the ink portion 14 using the relative positional relationship between the QR code 13 and the ink portion 14. In order to extract the ink portion 14, the QR code 13 is first detected. In a case where the QR code 13 is detected, the position of the ink portion 14 is specified by using a known relative positional relationship between the QR code 13 and the ink portion 14 (the relative positional relationship is indicated by a vector in the figure). Then, the square ink portion 14 is extracted from the photographed image at the specified position.

However, as described above, since the random pattern of the ink portion 14 changes depending on the irradiation direction of light, an irradiation angle φ of irradiation light from the light source unit 22a and an angle on the plane need to be set to be substantially the same as an angle which is a condition in a case where the registered image is acquired. The expression "substantially the same" means a permissible range that includes deviations from the desired angle required to ensure the collation accuracy. In a case where the user uses a mobile terminal such as a smartphone as the collation image photographing machine 22, it is relatively difficult to set the elevation angle φ and the angle on the plane to a desired angle due to a manual operation. Although it is possible to conceive of a method of automatically repeating the photographing and adopting an image with a good condition, in a case where there is no way for a photographer to know whether or not the angles are appropriate, it is not possible to acquire an image with a good condition in a short time.

In particular, in a case where a mobile terminal such as a smartphone is used as the collation image photographing machine 22, since there are a wide variety of smartphones on the market and the arrangement of the light source unit 22a and the camera unit 22b is also diverse, the arrangement of the camera unit 22b with respect to the light source unit 22a differs, and the reflected light of the ink portion 14 photographed at the time of collation is also different, which causes a decrease in the collation accuracy. Therefore, even in a case where a wide variety of smartphones and the like existing in the market are used as the collation image photographing machine 22, it is necessary to ensure a fixed collation accuracy.

It is assumed that a specific smartphone will be used as the registered image photographing machine 20, but considering the functional reliability for adoption as high-speed photographing/production equipment, using a specific smartphone is not familiar to this, and it is ideal to adopt a dedicated camera. In addition, considering that the mainstream of the evolution of smartphones as cameras is to install a multi-lens camera, select the most appropriate camera for each scene, and make a difference between each company by a method of creating a picture of sensor data, it is difficult to adopt a specific smartphone as the registered image photographing machine 20.

In the present exemplary embodiment, it is assumed that a dedicated camera is used as the registered image photographing machine 20 and a mobile terminal such as a smartphone is used as the collation image photographing machine 22, and adjustment control is performed during smartphone photographing so that an amount of light reflected from the ink portion 14 and incident on the camera lens matches in the dedicated camera and the smartphone as much as possible and photographing postures of both match. As a result, in a case where a distance between the light source unit 22a and the camera unit 22b of the smartphone fluctuates depending on the model, for example, the distance varies from 8.5 mm to 15 mm, by adjusting the photographing condition at the time of registration, the fluctuation can be handled regardless of the model of the smartphone, but it is not always guaranteed that the distance between the light source unit 22a and the camera unit 22b of the smartphone is within the range of 8.5 mm to 15 mm, and it may be assumed that the distance exceeds the range in some cases.

Therefore, in the present exemplary embodiment, the processor 22c detects a bright spot portion of light emitted from the light source unit 22a from the photographed image obtained by the camera unit 22b, and detects the distance between the light source unit 22a and the camera unit 22b by using a position of the bright spot portion.

Figure 5A:
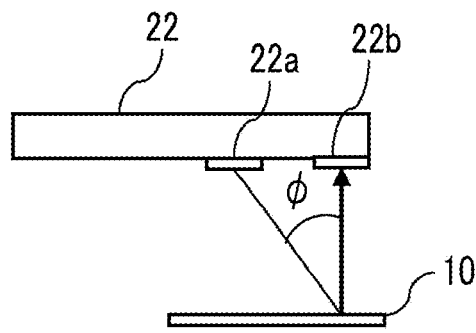
FIGS. 5A and 5B are explanatory diagrams showing a positional relationship between a light source unit, a camera unit, and an object of an exemplary embodiment.

FIG. 5A shows a case where a surface of the collation image photographing machine 22 such as a smartphone provided with the light source unit 22a and the camera unit 22b and a surface of the object 10 are parallel. At this time, even in a case where the distance between the light source unit 22a and the camera unit 22b fluctuates depending on the model, the bright spot portion of the light emitted from the light source unit 22a, that is, a specular reflection portion of the light is positioned in the middle of the light source unit 22a and the camera unit 22b, the distance between the light source unit 22a and the camera unit 22b can be calculated by detecting the bright spot portion of the light.

Figure 5B:
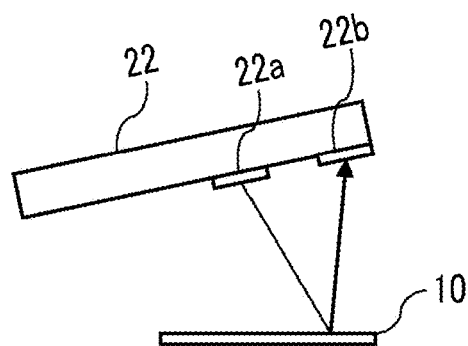

On the other hand, FIG. 5B shows a case where the surface of the collation image photographing machine 22 such as a smartphone provided with the light source unit 22a and the camera unit 22b and the surface of the object 10 are not parallel. At this time, since the bright spot portion of the light is not positioned in the middle of the light source unit 22a and the camera unit 22b, the distance between the light source unit 22a and the camera unit 22b cannot be calculated by the method described above.

Therefore, in the present exemplary embodiment, it is assumed that the surface of the collation image photographing machine 22 such as a smartphone provided with the light source unit 22a and the camera unit 22b and the surface of the object 10 are parallel, and under this premise, the distance between the light source unit 22a and the camera unit 22b is calculated by detecting the position of the bright spot portion, and it is confirmed whether or not the calculated distance is within the range of 8.5 mm to 15 mm. Note that a method for confirming that the surface of the collation image photographing machine 22 such as a smartphone provided with the light source unit 22a and the camera unit 22b and the surface of the object 10 are parallel will be further described later.

Figure 6:
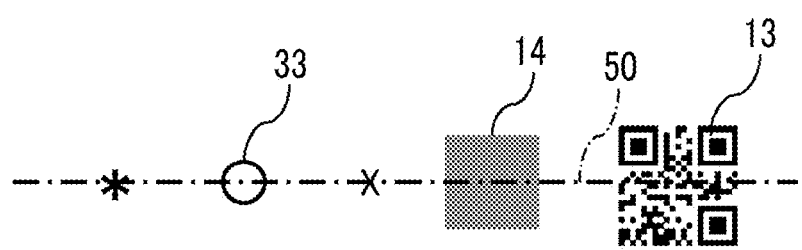
FIG. 6 is an explanatory diagram showing a positional relationship between a light source unit, a camera unit, and a bright spot of an exemplary embodiment.

FIG. 6 schematically shows a positional relationship in a case where the light source unit 22a, the camera unit 22b of the collation image photographing machine 22, and the bright spot portion of the light from the light source unit 22a such as a smartphone are projected onto the surface of the object 10. This is a case where the surface of the collation image photographing machine 22 such as a smartphone provided with the light source unit 22a and the camera unit 22b and the surface of the object 10 are parallel.

In FIG. 6, in a case where the QR code 13 is used as a reference, it is assumed that light is emitted in a direction opposite to a direction facing the QR code 13. In a case where the positions where the light source unit 22a and the camera unit 22b are projected onto the surface of the object 10 are indicated by "*" mark and "X" mark, respectively, these positions and the ink portion 14 are arranged on a straight line. By arranging the light source unit 22a, the camera unit 22b, and the ink portion 14 on a straight line 50 on the projection surface in this way, posture adjustment at the time of photographing is facilitated. At this time, a bright spot portion 33 of the light from the light source unit 22a is an intermediate position between the "*" mark, which is the projection position of the light source unit 22a, and the "X"

mark, which is the projection position of a center of the camera unit 22*b*. By detecting the bright spot portion 33, detecting the distance from the center of the camera unit 22*b*, that is, the center of the photographed image, and doubling the distance, the distance between the light source unit 22*a* and the camera unit 22*b* can be calculated.

Figure 7:
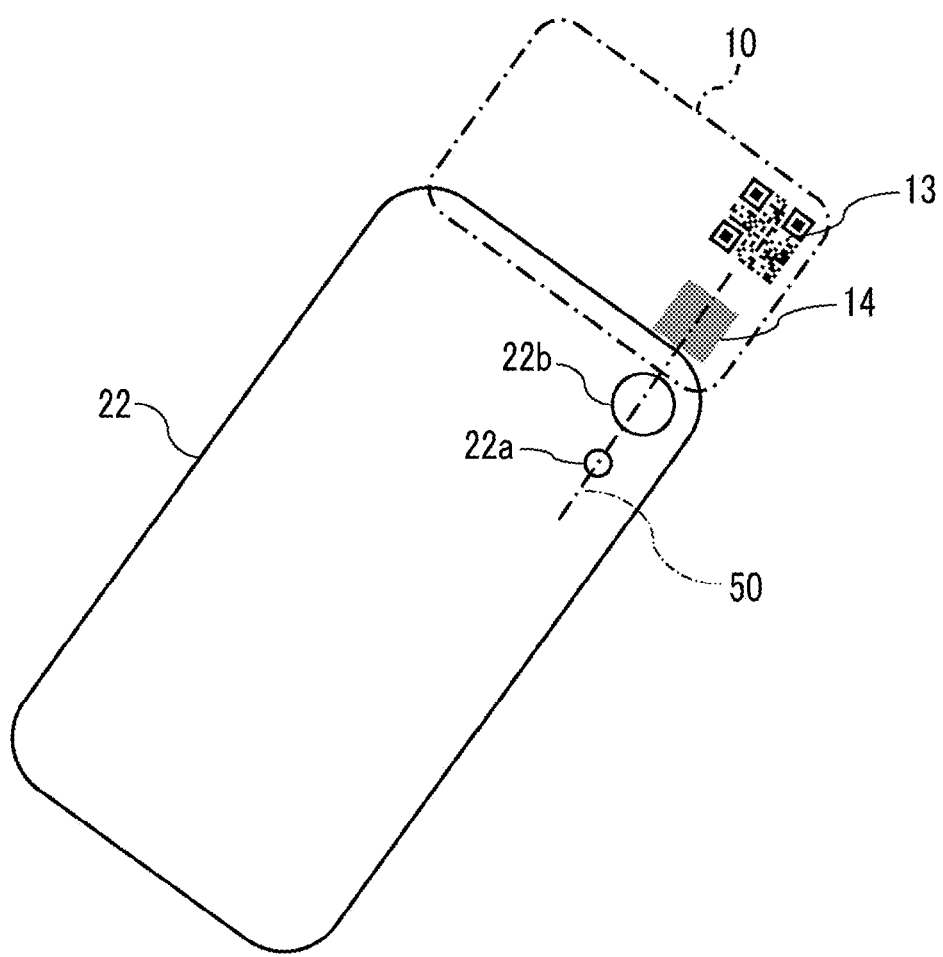
FIG. 7 is an explanatory diagram (No. 1) showing a positional relationship between a collation image photographing machine and an object of an exemplary embodiment.

FIG. 7 schematically shows a positional relationship between a smartphone as the collation image photographing machine 22 and the object 10. As shown in FIG. 7, the light source unit 22*a* and the camera unit 22*b* of the smartphone are provided to be arranged in a vertical direction on a back surface side. The light source unit 22*a* is provided on a lower side in the vertical direction, and the camera unit 22*b* is provided on an upper side.

Note that although not shown in FIG. 7, the output unit 22*g* as a display unit is provided on a front surface side of the collation image photographing machine 22, and the photographed image of the camera unit 22*b* is displayed as a preview image.

As shown in FIG. 7, the user grasps the smartphone so that an arrangement direction (vertical direction) of the light source unit 22*a* and the camera unit 22*b* matches an arrangement direction of the QR code 13 and the ink portion 14 of the object 10, and photographs an image so that the smartphone and the object 10 are substantially parallel and the camera unit 22*b* faces the ink portion 14. As a result, the positional relationship among the light source unit 22*a*, the camera unit 22*b*, and the ink portion 14 is as shown in FIG. 6, and arranged on the straight line 50, and in this case, the bright spot portion 33 of the light is detected, the distance between the light source unit 22*a* and the camera unit 22*b* is calculated, and it is confirmed that the distance is within a fixed range, thereby acquiring a random pattern image of the ink portion 14. In FIG. 7, since the QR code 13 is positioned above the ink portion 14, it can be said that the image is photographed by emitting light from below the ink portion 14 with this as a reference.

In FIG. 7, light is emitted from below the ink portion 14, but of course it is also possible to emit light from other directions.

Figure 8:
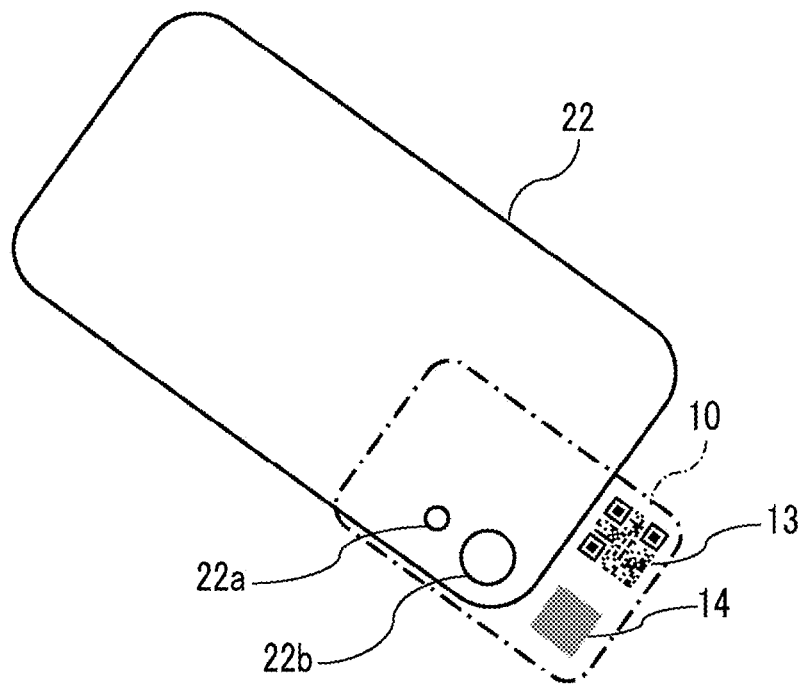
FIG. 8 is an explanatory diagram (No. 2) showing a positional relationship between a collation image photographing machine and an object of an exemplary embodiment.

FIG. 8 schematically shows a case where light is emitted from the left side of the ink portion 14. The light source unit 22*a* and the camera unit 22*b* of the smartphone are arranged in a vertical direction on the back surface side as in FIG. 7, and the light source unit 22*a* is provided on the lower side in the vertical direction, and the camera unit 22*b* is provided on the upper side. By rotating the smartphone 90 degrees clockwise from the state shown in FIG. 7, the positional relationship shown in FIG. 8 is obtained. In a case where the registered image is photographed by emitting light from the left side of the ink portion 14, the image is photographed in the posture shown in FIG. 8 to have the same condition.

Figure 9:
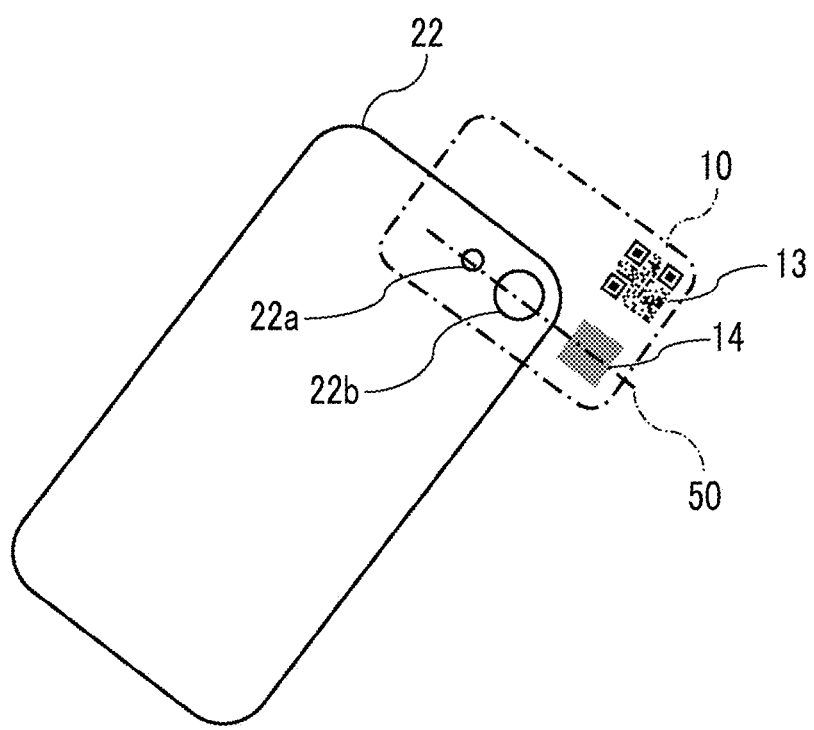
FIG. 9 is an explanatory diagram (No. 3) showing a positional relationship between a collation image photographing machine and an object of an exemplary embodiment.

FIG. 9 shows a case where the model of the smartphone as the collation image photographing machine 22 is different, and the light source unit 22*a* and the camera unit 22*b* of the smartphone are arranged in a horizontal direction on the back surface side unlike FIG. 7. In this case, as shown in FIG. 9, the user holds the smartphone and photographs so that the light source unit 22*a*, the camera unit 22*b*, and the ink portion 14 are arranged on the straight line 50.

Figure 10:
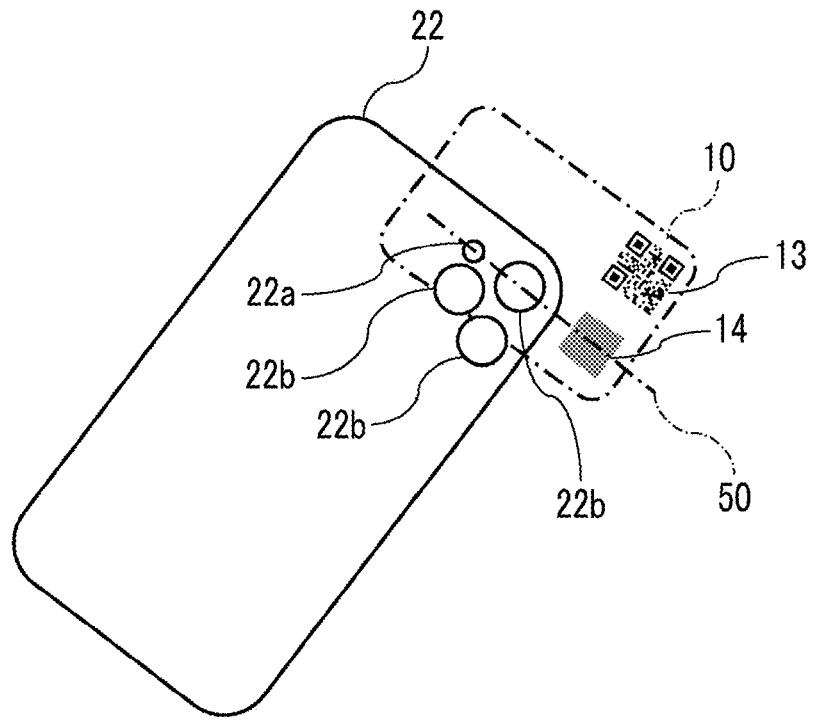
FIG. 10 is an explanatory diagram (No. 4) showing a positional relationship between a collation image photographing machine and an object of an exemplary embodiment.

FIG. 10 shows a case where the model of the smartphone as the collation image photographing machine 22 is further different, and unlike FIG. 7, three camera units 22*b* of the smartphone are arranged and provided on the back surface side. Also in this case, as shown in FIG. 10, the user grasps the smartphone and photographs so that the light source unit 22*a*, the camera unit 22*b* used for photographing among the three camera units 22*b*, and the ink portion 14 are arranged on the straight line 50.

Note that in the registered image photographing machine 20, in a case where the light source unit 21, the camera unit 22*b*, and the ink portion 14 are not arranged on a straight line and the image is photographed at a specific angle on a plane and registered as a registered image, needless to say, the collation image photographing machine 22 also photographs at the specific angle.

Figure 11A:
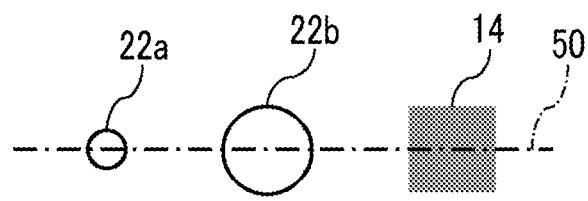
FIGS. 11A and 11B are explanatory diagrams showing a straight line arrangement and a non-straight line arrangement of a light source unit, a camera unit, and an object of an exemplary embodiment.
Figure 11B:
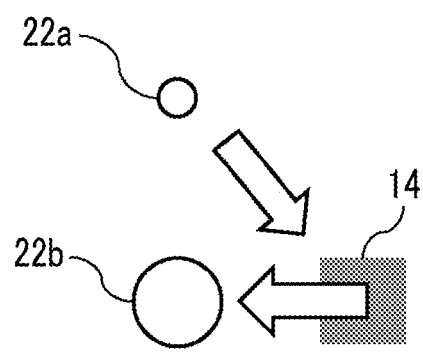

FIGS. 11A and 11B schematically show this case. FIG. 11A shows a case where the light source unit 22*a*, the camera unit 22*b*, and the ink portion 14 are arranged on the straight line 50. On the other hand, FIG. 11B shows a case where the light source unit 22*a*, the camera unit 22*b*, and the ink portion 14 are not arranged on a straight line. Light is emitted from diagonally above the ink portion 14, reflected, and incident on the camera unit 22*b*.

In this way, by grasping a smartphone and photographing an image so that the light source unit 22*a*, the camera unit 22*b*, and the ink portion 14 are arranged on a straight line (in some cases, on a non-straight line) and detecting the bright spot portion 33 of light, the distance between the light source unit 22*a* and the camera unit 22*b* can be detected, but since the QR code 13 exists in the object 10 in addition to the ink portion 14, the position of the bright spot portion 33 may be difficult to detect depending on the irradiation direction of light.

Figure 12A:
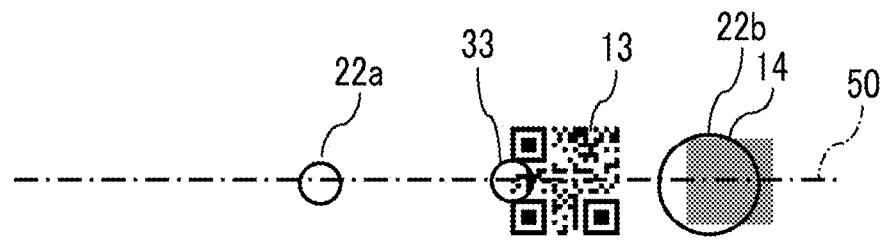
FIGS. 12A and 12B are explanatory diagrams showing a positional relationship between a bright spot position and a QR code of an exemplary embodiment.
Figure 12B:
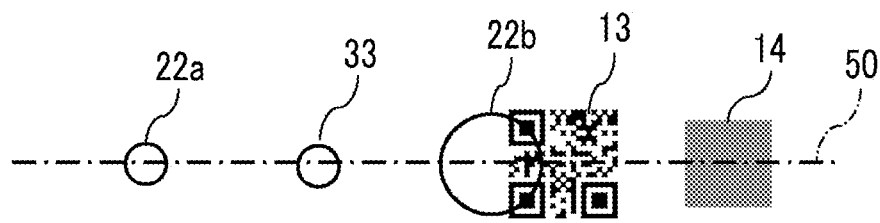

FIGS. 12A and 12B schematically show the positional relationship in this case. It is a case of emitting light from above the ink portion 14, and although the light source unit 22*a*, the camera unit 22*b*, and the ink portion 14 are arranged on the straight line 50, since the QR code 13 exists between the light source unit 22*a* and the ink portion 14, as shown in FIG. 12A, the bright spot portion 33 may be positioned in the QR code 13 depending on the distance between the center of the camera unit 22*b* and the ink portion 14, and the QR code 13 and the bright spot portion 33 coexist, thereby making it difficult to detect the bright spot portion 33 from the image.

On the other hand, FIG. 12B shows a case where the distance between the center of the camera unit 22*b* and the ink portion 14 is adjusted, and by shifting the center of the camera unit 22*b* to the left from the ink portion 14, the bright spot portion 33 is separated from the QR code 13, and it becomes easy to detect the bright spot portion 33 from the image. The inventors of the present application have confirmed in FIG. 12B that the bright spot portion 33 can be separated from the QR code 13 by setting the distance between the camera unit 22*b* and the ink portion 14 to about 10 mm, but is not limited to this.

As described above, since the distance between the light source unit 22*a* and the camera unit 22*b* can be calculated by detecting the bright spot portion 33 of light, even in a case where the model information of the smartphone as the collation image photographing machine 22 is not provided, the positional relationship required for photographing can be specified, and it is not necessary to prepare a registered image for each model of the smartphone.

In a case where the distance between the light source unit 22*a* and the camera unit 22*b* is calculated and the calculated distance is not within the range of 8.5 mm to 15 mm, the collation accuracy is not ensured even in a case where the image is collated with the registered image registered in the registered image DB 50*b*, however, in a case where a second registered image is acquired in advance with a dedicated camera in which the distance is not within the range of 8.5 mm to 15 mm and registered in the registered image DB 50*b*, the collation with the second registered image can be performed. In short, a first registered image and a second registered image are prepared as registered images, and in a case where the distance between the light source unit 22*a* and the camera unit 22*b* is within a fixed range, the image is collated with the first registered image, and in a case where the distance is not within the fixed range, the image is collated with the second registered image. In this case as well, although the number of registered images increases, the registered images for each model of the smartphone are not required.

In a case where the random pattern of the ink portion 14 is photographed by the collation image photographing machine 22 such as a smartphone, as shown in FIGS. 7 to 10, it is possible to photograph from various photographing directions, but, for example, it is desirable to display some guides for photographing from the same direction as the photographing direction at the time of acquiring the registered image.

Therefore, the processor 22*c* displays a guide indicating the irradiation direction of light on a plane on the output unit 22*g* in a case where the surface of the collation image photographing machine 22 provided with the light source unit 22*a* and the camera unit 22*b* and the object 10 are substantially parallel.

Figure 13:
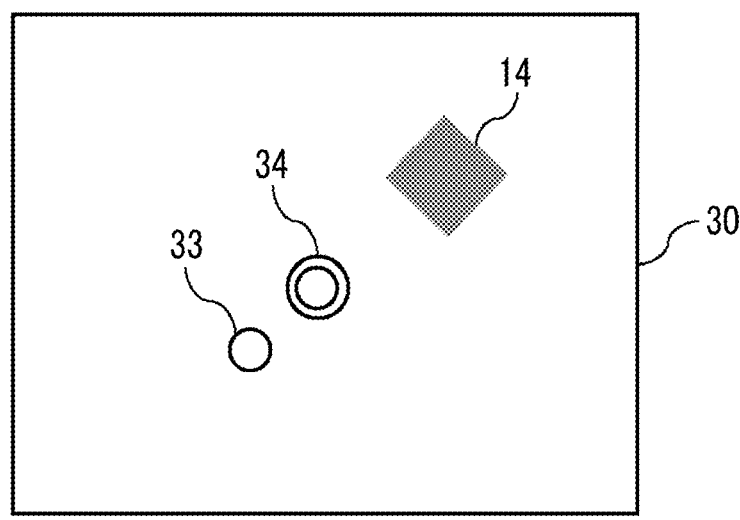
FIG. 13 is an explanatory diagram showing a guide for a bright spot of an exemplary embodiment.

FIG. 13 schematically shows a preview image 30 displayed on the output unit 22*g* as a display unit. The preview image 30 includes the bright spot portion 33 of light from the light source unit 22*a* and the ink portion 14. The processor 22*c* superimposes and displays a guide 34 indicating the irradiation direction of light with respect to the ink portion 14 on the preview image 30. The user can adjust the irradiation direction of light with respect to the ink portion 14 in a desired direction by adjusting the photographing posture of the collation image photographing machine 22 so that the bright spot portion 33 of light matches the guide 34.

Figure 14:
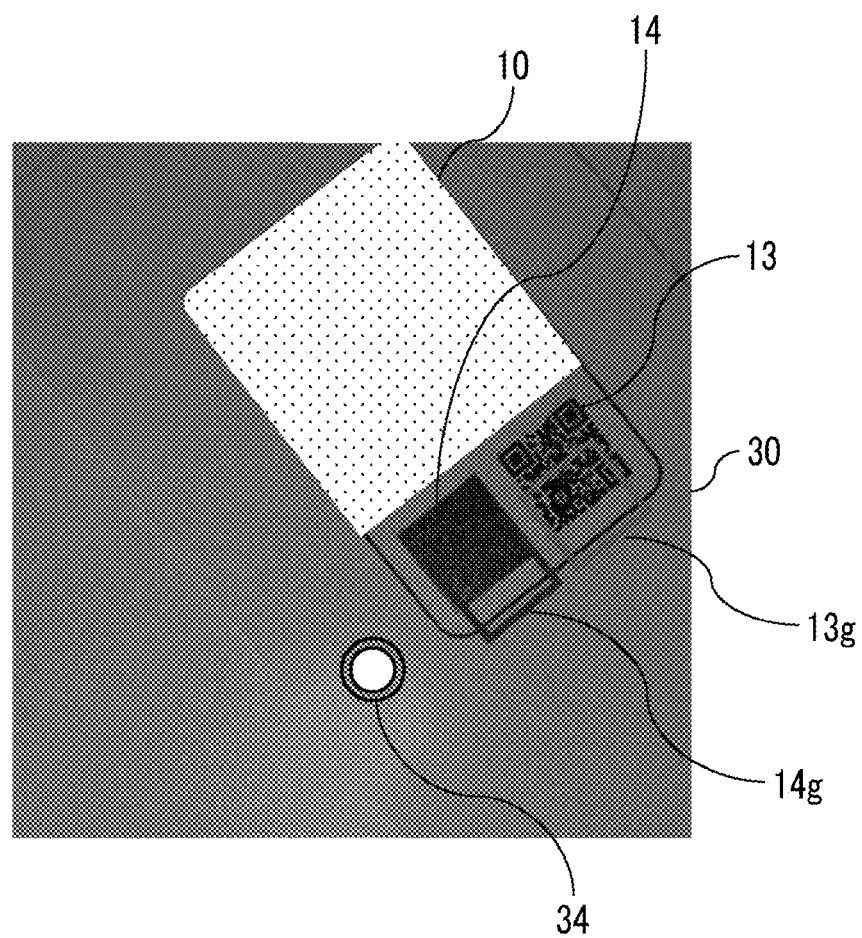
FIG. 14 is an explanatory diagram of a guide displayed on a preview image of an exemplary embodiment.

FIG. 14 shows the preview image 30 displayed on the output unit 22*g* as the display unit in detail. The QR code 13 and the ink portion 14 of the object 10 are displayed on the preview image 30. Further, although not explicitly shown in the figure, there is a bright spot portion of light from the light source unit 22*a*. In a case where the processor 22*c* detects the QR code 13 in the preview image 30, the processor 22*c* superimposes and displays a guide frame 13*g* indicating the QR code 13 on the preview image 30, and displays a guide frame 14*g* indicating the ink portion 14 having a known relative positional relationship from the QR code 13 on the preview image 30. Further, the processor 22*c* displays the guide 34 of the bright spot portion at a lower position of the ink portion 14 in a case where the desired irradiation direction of light with respect to the ink portion 14 is below the ink portion 14. In FIG. 14, the guide 34 is indicated by a double circle, but the form of the guide is not limited to this. The irradiation direction of light is uniquely determined by the combination of the guide frame 14*g* indicating the ink portion 14 and the guide 34. The user adjusts the photographing posture of the collation image photographing machine 22 such as a smartphone so that the ink portion 14 matches the guide frame 14*g* and the bright spot portion matches the guide 34. In a case where the desired irradiation direction of light with respect to the ink portion 14 is to the left of the ink portion 14, the processor 22*c* may display the guide 34 at the left position of the ink portion 14.

The processor 22*c* displays the guide frame 14*g* or the guide 34 in a case where the surface of the collation image photographing machine 22 provided with the light source unit 22*a* and the camera unit 22*b* and the object 10 are substantially parallel, but whether or not the surface of the collation image photographing machine 22 provided with the light source unit 22*a* and the camera unit 22*b* and the object 10 are substantially parallel may be determined by providing a gyro sensor on the collation image photographing machine 22 in a case where the object 10 is placed on a horizontal plane and detecting whether or not the posture of the collation image photographing machine 22 is horizontal by a sensor signal from the gyro sensor, for example.

Alternatively, in a case where the distance between the light source unit 22*a* and the camera unit 22*b* of the collation image photographing machine 22 is known, as described above, the distance can also be used as an angle guide for making the guide 34 parallel by using the fact that the bright spot portion is positioned at an intermediate point between the light source unit 22*a* and the camera unit 22*b* in a case where the surface of the collation image photographing machine 22 provided with the light source unit 22*a* and the camera unit 22*b* and the object 10 are substantially parallel. That is, the processor 22*c* displays the guide 34 at a position where a bright spot portion would exist in a case where the surface of the collation image photographing machine 22 provided with the light source unit 22*a* and the camera unit 22*b* and the object 10 are substantially parallel, and the user adjusts an inclination of the collation image photographing machine 22 so that the bright spot portion coincides with the guide 34.

Further, in a case where the object 10 has the hologram portion 12*b* as the printing substrate as shown in FIG. 3A, it is possible to detect whether or not the surface of the collation image photographing machine 22 provided with the light source unit 22*a* and the camera unit 22*b* and the object 10 are substantially parallel by using the fact that a color development pattern of the hologram portion 12*b* changes depending on the irradiation direction of light.

Figure 15:
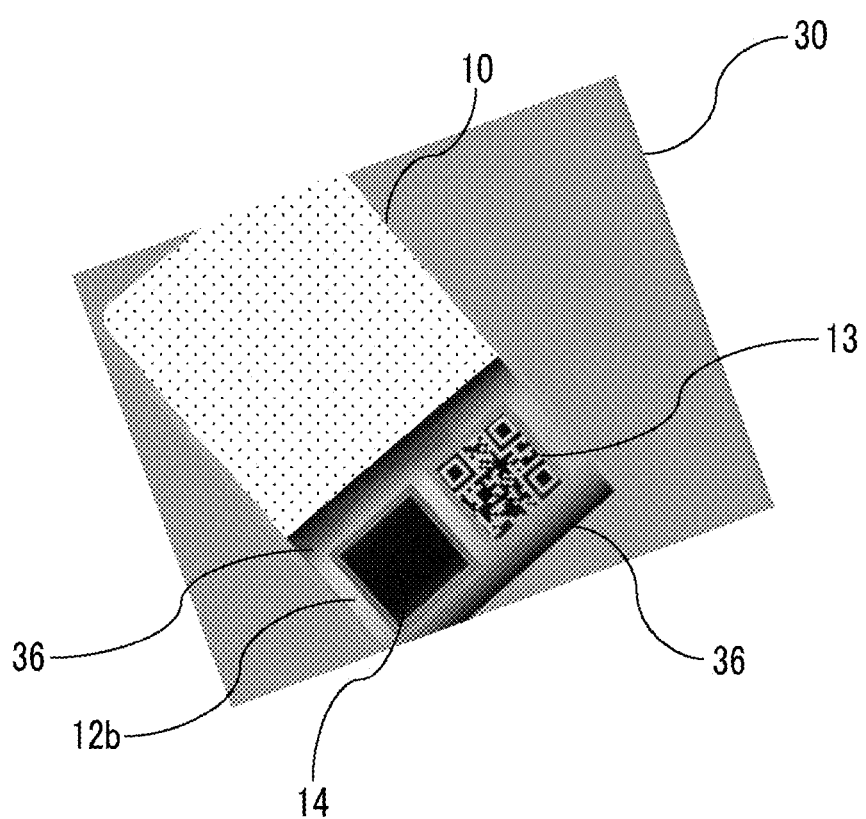
FIG. 15 is an explanatory diagram of another guide displayed on a preview image of an exemplary embodiment.

FIG. 15 shows another preview image 30 displayed on the output unit 22*g* of the collation image photographing machine 22. The QR code 13 and the ink portion 14 of the object 10 are displayed on the preview image 30. As shown in FIG. 3A, the object 10 shows a case where the printing substrate is the hologram portion 12*b*. The QR code 13 and the ink portion 14 are printed on the satin-treated hologram portion 12*b*, and since the hologram portion 12*b* changes the color development pattern in accordance with the irradiation direction of light, here, the elevation angle φ in FIG. 1, in a case of focusing on the periphery of the ink portion 14, the color development pattern around the ink portion 14 changes in accordance with the elevation angle 9. Therefore, the color development pattern (or color or pattern) can be used as a guide of the elevation angle.

In addition to the color development pattern (or color or pattern), a message about the color development pattern may be displayed at a fixed position on the preview image 30. For example, in a case where the color development pattern around the ink portion 14 becomes the rainbow color in a case where the elevation angle φ substantially matches the desired angle, a message such as "Please photograph in a dark place. Please match the rainbow color with the sample" is displayed. By displaying the rainbow color around the ink portion 14 and matching the actual color development pattern by using the rainbow color as a guide 36, the user can visually confirm the deviation of the elevation angle.

Further, the guide 36 may be displayed, the current elevation angle and the desired elevation angle may be compared, and a message may be displayed as to which direction the user should adjust the elevation angle. For example, a message such as "head up" instructing the head of the collation image photographing machine 22 to face upward is displayed, or a message such as "bottom up" instructing the bottom of the collation image photographing machine 22 to face upward is displayed.

As described above, the processor 22c detects that the surface of the collation image photographing machine 22 and the object 10 are substantially parallel by using a gyro sensor or an image. Note that the shape of the ink portion 14 is known (in the present exemplary embodiment, a square), and it may be detected that the ink portion 14 is not parallel by using a distortion from the known shape. However, since the distortion of the shape due to non-parallelism is less than 1% per degree, it is conceivable to use the distortion in combination with other methods.

Figure 16:
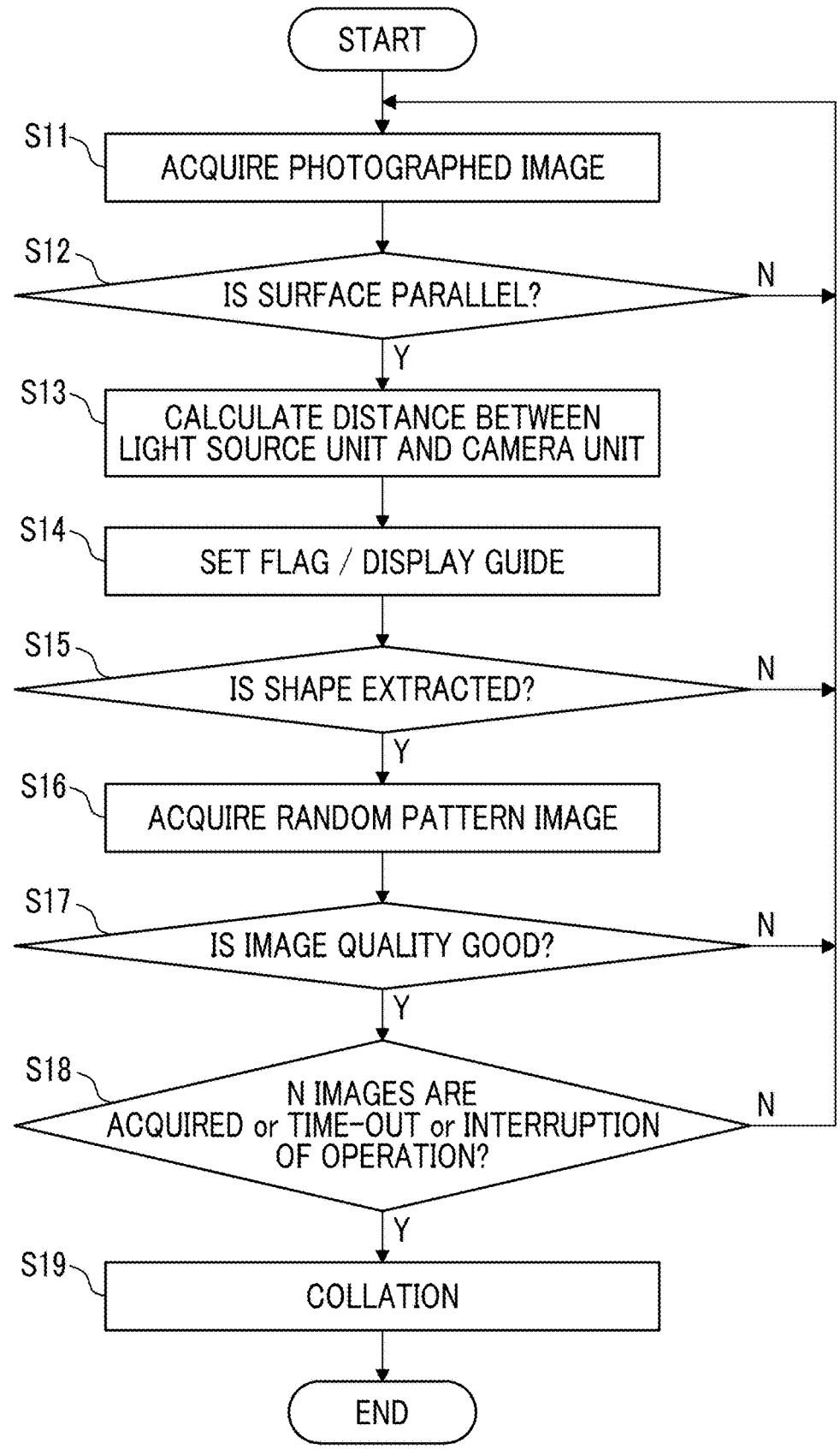
FIG. 16 is a processing flowchart of an exemplary embodiment.

FIG. 16 shows a processing flowchart of the processor 22c. This is processing realized by reading and executing a program stored in the ROM 22d or the like.

First, the processor 22c acquires a photographed image obtained by the camera unit 22b (S11).

Next, it is determined whether or not the surface provided with the light source unit 22a and the camera unit 22b and the object 10 are substantially parallel (S12). This determination may be performed based on the sensor signal from the gyro sensor, or the position of the bright spot portion in the image or the color development pattern of the hologram portion 12b may be used.

In a case where the surface provided with the light source unit 22a and the camera unit 22b and the object 10 are not substantially parallel (NO in S12), the processor 22c prompts the user to operate in parallel by displaying a message as appropriate.

In a case where the surface provided with the light source unit 22a and the camera unit 22b and the object 10 are substantially parallel (YES in S12), in a case where the distance between the light source unit 22a and the camera unit 22b is not known, the bright spot portion of light from the light source unit 22a is detected, and the distance between the light source unit 22a and the camera unit 22b is calculated by using the position of the detected bright spot portion (S13). Then, a flag for identifying whether or not the calculated distance is within a fixed range is set (S14). This flag functions as a flag for instructing the server computer 50 to collate the image with the first registered image in a case where the distance is within the fixed range and to collate the image with the second registered image in a case where the distance is not within the fixed range. Since it is usually assumed that the range is within the fixed range, a flag to that effect may be set only in a case where the range is not within the fixed range. Then, the guide 34 for instructing the irradiation direction of light on a plane is displayed, the light source unit 22a, the camera unit 22b, and the ink portion 14 are arranged on a straight line, and the user is guided to irradiate the ink portion 14 with light from a desired direction.

In a case where the photographing posture of the collation image photographing machine 22 such as a smartphone is determined as described above, the image of the ink portion 14 is automatically photographed by the camera unit 22b, and the shape of the ink portion 14 (in this case, a square) is extracted from the obtained image (S15).

Figure 17:
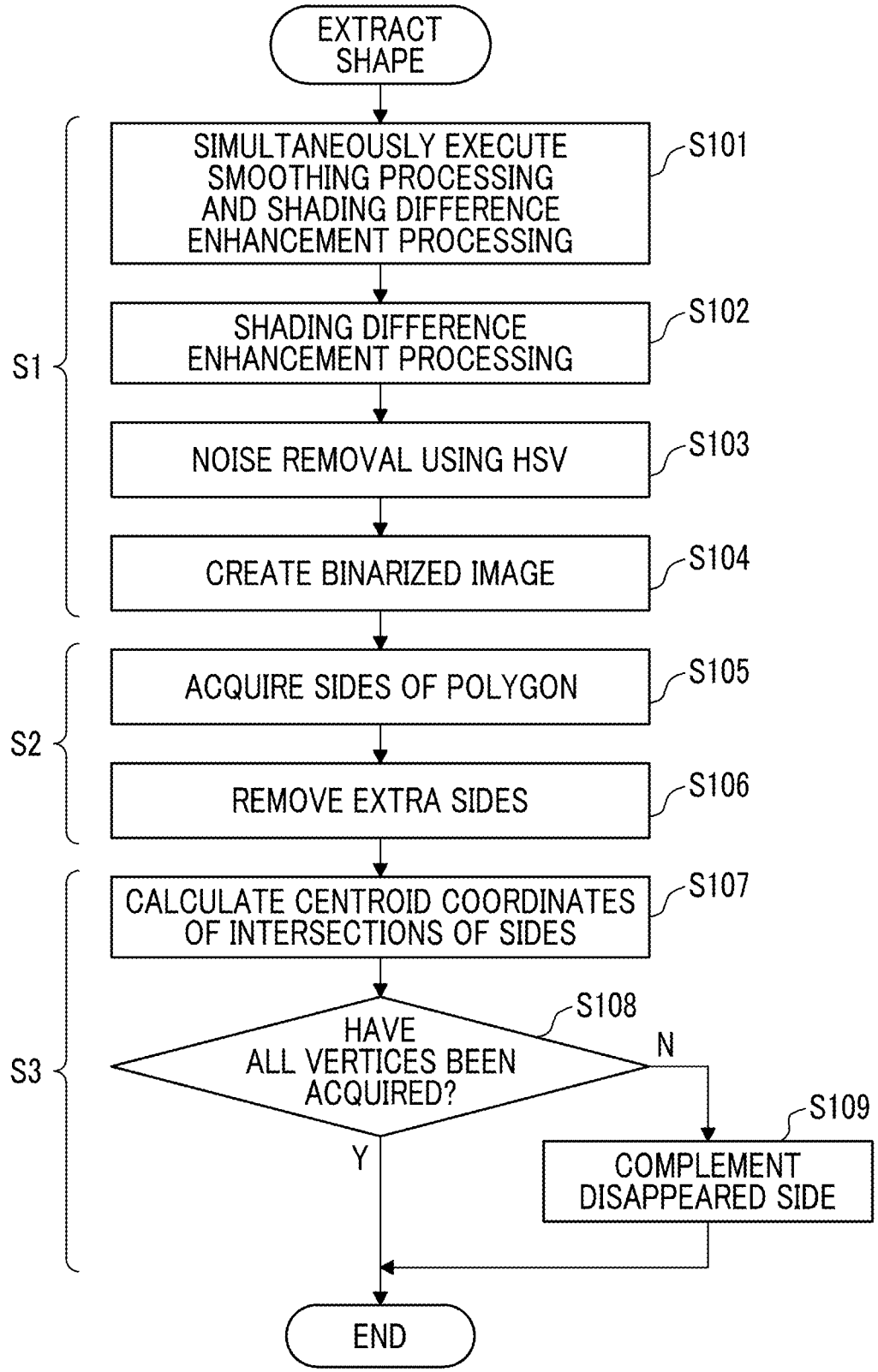
FIG. 17 is a detailed flowchart of shape extraction processing of an exemplary embodiment.

FIG. 17 shows a detailed flowchart of the shape extraction.

The purpose of the processing flowchart is to acquire coordinates of the four vertices of the ink portion 14 of the square from the photographed image, and the processing is substantially classified into three processing of binarized image generation processing (S1), rectangular edge extraction processing (S2), and vertex coordinate estimation processing (S3).

Binarized Image Generation Processing

First, the binarized image generation processing (S1) will be described.

In the processing, first, smoothing processing and shading difference enhancement processing are simultaneously executed on the original image (S101). The shape of the ink portion 14 is blurred by simply performing the smoothing processing on the original image. Further, although the unevenness of the ink portion 14 is emphasized by simply performing the shading difference enhancement processing on the original image, the unevenness of the hologram portion 12b is also emphasized at the same time, so that the ink portion 14 cannot be extracted.

Therefore, the smoothing processing and the shading difference enhancement processing are simultaneously executed on the original image to remove the unevenness of the hologram portion 12b and the ink portion 14, and the ink portion 14 is identified from the hologram portion 12b. Specifically, a mean-shift filter can be used for simultaneous execution of the smoothing processing and the shading difference enhancement processing. The mean-shift filter is realized by the processor 22c. The mean-shift filter is a filter that fills similar colors in a designated pixel space with the same color. As a result, the color of the silver ink portion 14 approaches the same color, and a boundary between a rainbow-colored background of the hologram portion 12b and the silver ink portion 14 has a different color area, so that a shading difference of the boundary between the hologram portion 12b and the ink portion 14 is emphasized while the shape of the ink portion 14 is maintained.

Note that although there is a filtering method of performing smoothing processing while retaining the edges, such as a bilateral filter, the inventors have confirmed that the noise in the hologram portion 12b and the ink portion 14 cannot be removed by the method. By using the mean-shift filter, smoothing is performed for each color by using the color difference between the hologram portion 12b and the ink portion 14 while retaining the edges, and noise can be removed without losing the edges.

The mean-shift filter first searches for the center of gravity of the color distribution of the original image. That is, centroid coordinates (xc, yc) and the colors (rc, gc, bc) of a color space area having a radius sr centered on the colors (r, g, b) of certain pixels (x, y) are calculated and the center of gravity is searched under the following condition. Here, sp is a radius of a search area.

Condition: $|x-xc| \le sp, |y-yc| \le sp, \|(r,g,b)-(rc,gc,bc)\| \le sr$

Then, in a case where the above condition is satisfied, the center of gravity is searched again by setting (x, y, r, g, b)=(xg, yg, rc, gc, bc). The above center of gravity search processing is repeatedly executed.

Then, a color space distance E and the number of repetitions n are set in advance, it is determined whether or not the following condition is satisfied, and in a case where the condition is satisfied, the processing ends.

Condition: the number of repetitions n is satisfied, or $|x-xc|+|y-yc|+(r-rc)^2+(g-gc)^2+(b-bc)^2 < \varepsilon$.

After the center of gravity search processing ends, smoothing is performed with the value of the center of gravity in the color space. That is, after the polar search ends, each pixel in the space is set as a center of gravity value of the color space. The edges are then clarified by using the Gaussian pyramid and the threshold sr.

Since the mean-shift filter performs the smoothing processing by using a distance difference in the color space, this is effective processing in a case where there is a difference in the color space distance between the foreground and the background. Therefore, this is an effective processing for the original image in which an achromatic ink portion 14 exists in the foreground and a chromatic hologram portion 12b exists in the background.

In the mean-shift filter, the performance of the smoothing processing and the shading difference enhancement processing can be controlled by using a color space radius sr and a pixel space radius sp as main parameters. Therefore, by adjusting the parameters, a ratio of the smoothing processing and the shading difference enhancement processing can be adjusted. Specifically, (1) since a search range of pixels smoothed (filled) by the pixel space radius sp is designated,
  in a case where sp is large→search range can be adjusted to be wide, and
  in a case where sp is small→search range can be adjusted to be narrow.
Note that in a case where the sp is set too large, it takes a long time to processing, so it is desirable to take the fact into consideration, for example.

(2) Since the range of similar colors to be filled in the same color is determined by the color space radius sr,
  in a case where sr is large→it can be adjusted so that even slightly different colors are recognized as the same color, and
  in a case where sr is small→it can be adjusted so that similar colors are recognized as the same color.

In the present exemplary embodiment, the parameters sp and sr of the mean-shift filter are set to (sp, sr)=(10,30), or the like.

After the smoothing processing and the shading difference enhancement processing are simultaneously executed on the original image (S101), an additional shading difference enhancement processing is further executed for a portion where the shading difference cannot be obtained by the processing of S101 (S102).

In a case where there is no sufficient difference in the color space distance between the background color and the ink portion 14, the foreground and the background are assimilated, and there may be portions where the shading difference enhancement is insufficient only by the processing of S101. Therefore, by further executing the shading difference enhancement processing, the shape of the ink portion 14 is extracted more stably.

Specifically, the image processed in S101 is RGB-decomposed, and the shading difference enhancement processing is executed in each RGB color space. This means flattening of an in-image brightness histogram. Then, in order to extract an edge gradient, a Sobel filter for each of the vertical and horizontal directions is applied to each RGB color image. Note that since a gradient value calculated by the Sobel filter is not eight bits (256 gradations), it may be normalized to eight bits. The normalization method is processing of taking an absolute value of a gradient image and replacing all the pixel values of 255 or more with 255. As a result, the edge gradient may be acquired independently of disturbance noise.

After executing additional shading difference enhancement processing (S102), noise removal processing using an HSV color space is executed (S103). Here, the HSV color space is a color space composed of three components of Hue, Saturation/Chroma, and Value/Brightness.

In a case where a rough shape of the ink portion 14 is extracted in S102, noise is generated at a boundary between the white color and the light blue color of the hologram portion 12. In particular, since the gradients of the white color and the light blue color in an R space image are large, noise such as an edge is generated in a case where the Sobel filter is applied. Therefore, the noise is removed by using the HSV color space. Specifically, (1) a processed image 23 in S101 is HSV decomposed, (2) S image is binarized, (3) vertical and horizontal Sobel filter is applied to S binary image, and (4) black-and-white inverted binary image of vertical and horizontal Sobel image and H image are OR-synthesized.

After executing the processing of S103, a binarized image is created (S104). That is, a total of 6 vertical and horizontal direction gradient images of the R, G, and B images are respectively binarized. A binarization threshold may be set differently for each of R, G, and B. Then, a total of six binarized images of vertical and horizontal components and RGB color components are OR-synthesized.

Rectangular Edge Extraction Processing

Next, the rectangular edge extraction processing will be described.

After creating the binarized image in S104, the sides of the polygon constituting the square ink portion 14 are acquired from the binarized image (S105). Specifically, this is edge extraction processing using a stochastic Hough transform. Note that the stochastic Hough transform is an optimization of the Hough transform, and instead of calculating using all the pixels, points sufficient for straight line detection are randomly selected from the image and calculated. A (non-stochastic) Hough transform can also be used in S104. However, parameter tuning is difficult, and there is a drawback that the sensitivity is too good for the rectangular edges of the binarized image.

After acquiring the sides of the polygon (S105), the processing of removing extra sides is executed (S106). That is, straight lines that are not rectangular edges (sides) are removed from the straight lines extracted by the stochastic Hough transform. Specifically, a method of removing a straight line of which an angle where vertical and horizontal lines intersect is within a fixed angle, or removing a straight line in contact with an image frame is used. In addition to this, extra sides may be removed by extracting edges with a rectangular hue by using a color space.

Vertex Coordinate Estimation Processing

After the rectangular edge extraction processing (S2) is completed, the vertex coordinate estimation processing (S3) of the square ink portion 14 is executed.

In the processing, the centroid coordinates of the intersections of the sides are calculated from the image obtained by removing the extra sides in S105 (S107). That is, instead of the intersections consisting of each side, the centroid coordinates of an intersection group within a certain vicinity are calculated. Although the intersections of vertical and horizontal straight lines are calculated for the processed image 23 by addressing a one-dimensional simultaneous equation, since an edge width of the binarized image after OR-synthesis is two to three pixels, a plurality of straight lines are extracted for the same edge by the stochastic Hough transform. Therefore, there are a plurality of intersections in the vicinity of certain coordinates. Since these intersections are likely to indicate the same vertex, the centroid coordinates of the intersection group are acquired, and the centroid coordinates are redefined as the vertices of the shape of the ink portion 14.

In the centroid coordinate calculation processing of the intersection group, first, a plurality of intersections in a certain vicinity are dilated and combined into one. The dilation processing is processing in which in a case where there is a white pixel in peripheral pixels of a certain pixel, the pixel is converted into the white pixel thereby sequentially expanding the white pixel. Next, labeling is performed on each intersection set that has been dilated. Then, the centroid coordinates of each labeled intersection set are calculated. In a case where the centroid coordinates are calculated as described above, the calculated centroid coordinates are set as the vertex candidates. Since there are four vertices in the square ink portion 14, four vertex candidates can be set normally. In a case of setting the vertex candidates, known shape characteristics of the ink portion 14, that is, the lengths of the sides and diagonal lines can be used as the condition. In a case where there are a plurality of pairs of vertices that satisfy the condition, a plausible pair of vertices is selected. For example, in the square ink portion 14, the condition that the lengths of the four sides are equal to each other is used, and the pair having the smallest dispersion of the side lengths is set as the pair of vertices.

Then, it is determined whether or not all the vertices of the ink portion 14 have been acquired (S108). In the square ink portion 14, it is determined that all the vertices have been acquired in a case where the four vertices are acquired. In a case where all the vertices have not been acquired, it means that all the sides of the ink portion 14 have not been extracted, so complementary processing of the disappeared side is executed next (S109).

In the complementary processing of the side, it is determined whether or not three sides constituting the square have been extracted from the square ink portion 14. Normally, in a case where the ink portion 14 is printed on the hologram portion 12b as a printing substrate, in a case where the red of the background of the hologram portion 12 is covered with the red of the foreground, extraction of the side may fail. In short, it is a case where a color space distance difference between the background and the foreground is small. Therefore, it is first determined whether or not the three sides have been extracted. The selection of the three sides can be estimated from the known shape characteristics of the ink portion 14, that is, the length or the position of the edges.

In a case where three sides are extracted, a length x of the side among the three sides having no opposite side is calculated from the centroid coordinates already calculated. Then, a new parallel side is drawn at a portion separated by the length x of the side. Specifically, it is assumed that the four sides constituting the square are a, b, c, and d, a and c are opposite sides, and b and d are opposite sides, and in a case where only three sides of a, b, and c are extracted, a side parallel to b is drawn at a position separated by x from b to be d. As parallel sides separated by x from b, it is possible to estimate a total of two, one on each of both sides of b, and since one of the sides does not exist in the image, the side d can be uniquely drawn. This complements the disappeared sides.

After the complementary processing of the disappeared sides, the centroid coordinates of the intersection may be calculated again to acquire the coordinates of all the vertices.

Note that after the complementary processing of the disappeared sides, the threshold may be lowered for the binarized image obtained in S104, and the stochastic Hough transform may be executed again to reacquire the side, and the side obtained in this way and the side obtained by complementing may be integrated, and the processing may be transferred to the vertex coordinate estimation processing (S3) again.

Referring back to FIG. 16, in a case where the shape is extracted by acquiring the coordinates of the four vertices of the ink portion 14 as described above (YES in S15), the processor 22c acquires a random pattern image by cutting out the collation image with reference to the coordinates of these four vertices (S16). Then, an image quality evaluation of the obtained random pattern image, that is, whether or not the image quality of the random pattern image is good is determined (S17).

Specifically, whether or not the image quality is good can be determined by evaluating the following index values and determining whether or not these index values exceed the threshold.

(1) Whether the position, size, and angle of the square are appropriate
(2) Degree of blur (standard deviation of Laplacian filter value)
(3) Degree of shaking (maximum and minimum differences of standard deviation of Sobel filter values in four directions)
(4) Brightness (average brightness)
(5) Randomness (a value obtained by cutting out the portion of the central ¼ size of the image, obtaining the correlation value between each coordinate of the image and the image of the same size as the starting point, subtracting the average value from the maximum value of the correlation value group, and dividing by the standard deviation)
(6) Degree of deviation of the light source (aspect ratio of a brightness inclination of the image=an inclination in a case where an average brightness of the same row is linearly approximated in the column direction/the inclination in a case where the average brightness of the same column is linearly approximated in the row direction)

It is possible to determine whether or not the image quality is good by optionally combining any one or a plurality of these index values. For example, (1) and (6) are used, (1), (5), and (6) are used, or the like.

The processing of S11 to S17 is automatically repeated until a predetermined upper limit number of N images are acquired, until a timeout, or until the user interrupts the photographing operation (S18). Then, the collation processing is executed by using the random pattern images obtained for the upper limit number of N images or a plurality of random pattern images obtained until the timeout or the interruption of photographing (S19).

In the collation processing, a collation request is transmitted to the server computer 50 with the acquired upper limit number of N images or a plurality of random pattern images and the flag set in S14 attached. The collation unit 50a of the server computer 50 collates the received random pattern image with the registered image, and returns the collation result to the collation image photographing machine 22. The registered image is set according to the value of the flag. The processor 22c receives the collation result from the server computer 50 and displays the collation result on the output unit 22g.

Figure 18:
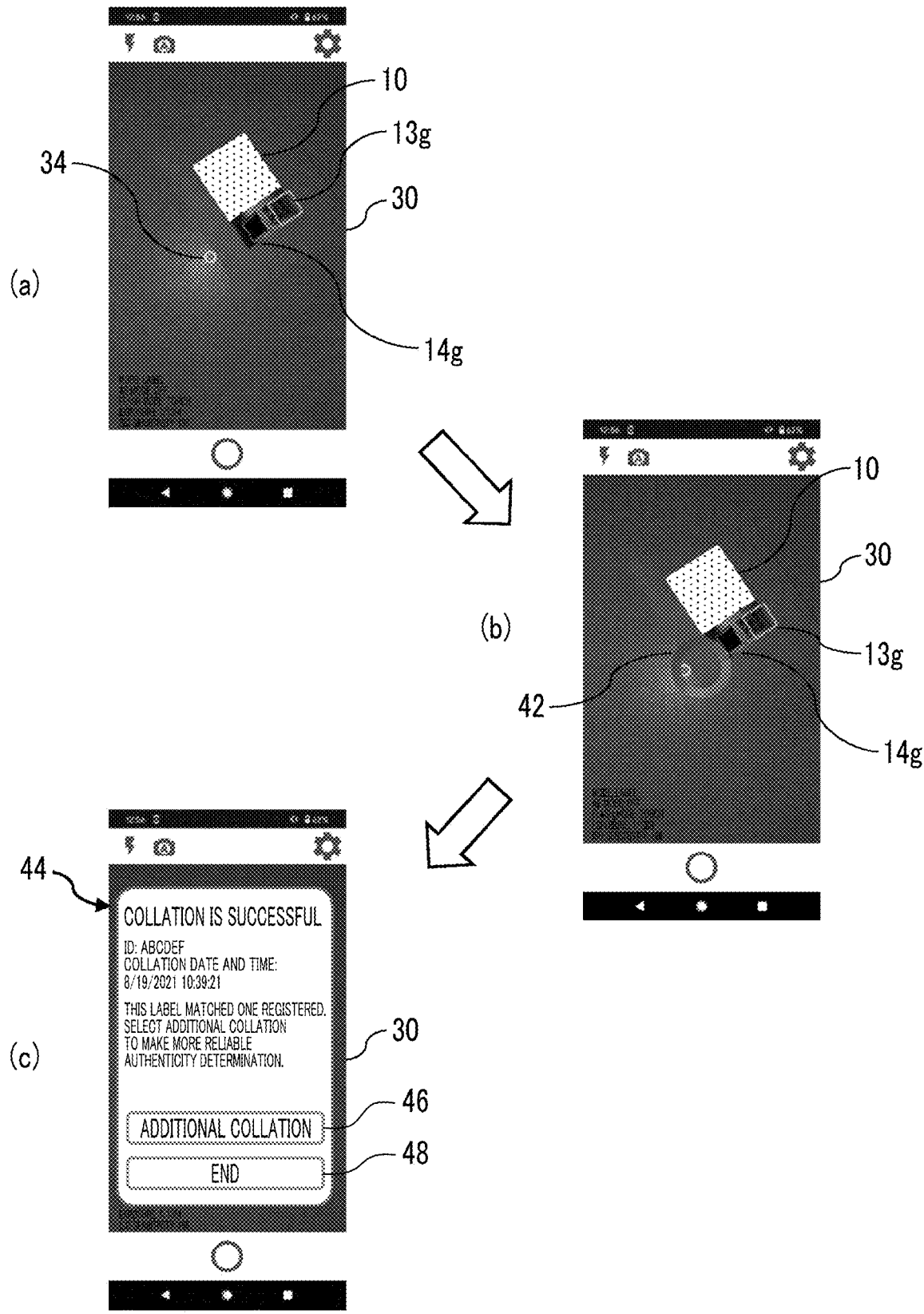
FIG. 18 is an explanatory diagram showing a series of processing of an exemplary embodiment.

FIG. 18 shows transition of the display screen of the output unit 22g accompanying the processing of FIG. 16. (a) of FIG. 18 shows the preview image 30, and the object 10, the guide frame 13g, the guide frame 14g, and the guide 34 are displayed. The guide 34 is displayed below the ink portion 14. (b) of FIG. 18 shows the preview image 30 in a case where the user adjusts the photographing posture of the collation image photographing machine 22 so that the bright spot portion of the light source unit 22a matches the guide 34, and a specific mark 38 is displayed in response to the fact that both positions match. At this time, the photographed image is automatically acquired, the random pattern image is cut out, and the photographed image is transmitted to the server computer 50 as the collation image for collation. During the collation, a ring-shaped mark 42 is displayed. By visually recognizing the mark 42, the user can confirm that the image is being collated by the server computer 50. (c) of FIG. 18 is the preview image 30 in a case where the collation is successful, and the message 44 "The collation is successful." is displayed. Further, along with the message 44, messages 46 and 48 of "additional collation" and "end" are displayed. In a case where the user selects the "additional collation" message 46, the processing proceeds to the additional collation processing, and in a case where the user selects the "end" message 48, the processing ends. In the additional collation processing, for example, the guide 34 is displayed on the left side of the ink portion 14, the light source unit 22a, the camera unit 22b, and the ink portion 14 are arranged on a straight line, and the user is guided to irradiate the ink portion 14 with light from a desired direction. By changing the irradiation direction of light between the first collation and the additional collation, the collation accuracy may be improved.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

First Modified Example

In the exemplary embodiment, while the light source unit 22a, the camera unit 22b, and the ink portion 14 are arranged on a straight line, the irradiation direction of light is changed between the first collation and the additional collation, however, at the time of the first collation, the light source unit 22a, the camera unit 22b, and the ink portion 14 may be arranged on a straight line, and in a case where the collation is successful and the additional collation is performed, the light source unit 22a, the camera unit 22b, and the ink portion 14 may be arranged on a non-straight line. Specifically, at the time of the first collation, the arrangement is as shown in FIG. 11A, and at the time of the additional collation, the arrangement is as shown in FIG. 11B or the like. Further, in the exemplary embodiment, the additional collation processing is performed in a case where the collation is successful, but the additional collation may be performed in a case where the collation fails, and regardless of the result of the success/failure of the collation, the additional collation processing may be performed every time. Further, before performing the collation processing, a plurality of captured images may be acquired by changing the irradiation direction of light, and the collation processing may be performed on each of the captured images. The number of additional collation processing is not particularly limited.

Further, in the exemplary embodiment, although the processor 22c displays the guide 34 for instructing the irradiation direction of light on a plane in a case where the surface provided with the light source unit 22a and the camera unit 22b and the object 10 are substantially parallel (YES in S12), even in a case where the surface provided with the light source unit 22a and the camera unit 22b and the object 10 are not yet substantially parallel, the guide 34 may be displayed in advance, and the guide 34 may be displayed together with a message prompting the user to operate in parallel.

Second Modified Example

In the exemplary embodiment, the processor 22c detects a bright spot portion of light emitted from the light source unit 22a from the photographed image obtained by the camera unit 22b, and detects a distance between the light source unit 22a and the camera unit 22b by using the position of the bright spot portion. However, the processor 22c may display a guide on the preview image 30 so that the image can be photographed at the same reflection surface angle as the registered image even in a case where the distance between the light source unit 22a and the camera unit 22b is different for each model of the collation image photographing machine 22 such as a smartphone without detecting the bright spot portion of the light emitted from the light source unit 22a. Here, the "reflection surface angle" is defined as a normal angle between the angles formed by the light source unit 22a, the ink portion 14, and the camera unit 22b.

Figure 19:
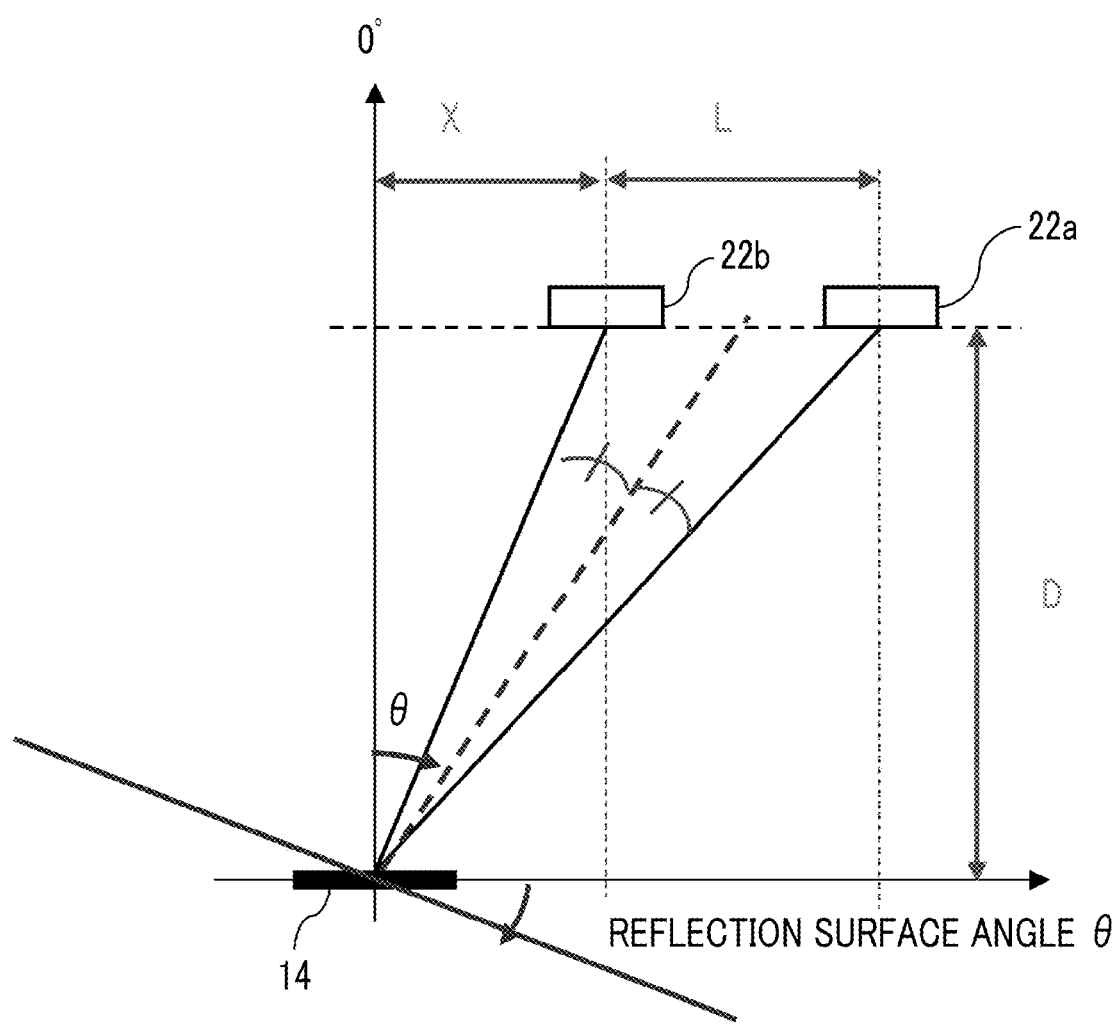
FIG. 19 is an explanatory diagram showing a relationship between a light source unit, a camera unit, an ink portion, and a reflection surface angle of a second modified example.

FIG. 19 shows the positional relationship between the light source unit 22a, the camera unit 22b, and the ink portion 14 in a case where the object 10 is photographed by the collation image photographing machine 22 such as a smartphone.

Assuming that a photographing surface of the collation image photographing machine 22 such as a smartphone and a surface of the object 10 are parallel to each other, and θ: reflection surface angle of the ink portion 14, L: distance between the light source unit 22a and the camera unit 22b in a plane direction of the object 10, X: distance between the ink portion 14 and the camera unit 22b in the plane direction of the object 10, and D: distance between the photographing surface of the collation image photographing machine 22 and the surface of the ink portion 14 (photographing distance), the following relationship holds.

$$\theta = \frac{1}{2}\left\{\arctan\left(\frac{X}{D}\right) + \arctan\left(\frac{X+L}{D}\right)\right\} = \frac{1}{2}\arctan\left(\frac{D(2X+L)}{D^2 - X(X+L)}\right)$$

Since the distance L between the light source unit 22a and the camera unit 22b can have various values depending on the model of the collation image photographing machine 22, by adjusting at least one of the distance X between the ink portion 14 and the camera unit 22b or the photographing distance D, the reflection surface angle θ can be made to match a target reflection surface angle.

In a case where the above Formula is transformed, $$X = \frac{-(L\tan 2\theta + 2D) \pm \sqrt{(L\tan 2\theta + 2D)^2 - 4(DL - D^2\tan 2\theta)\tan 2\theta}}{2\tan 2\theta}$$

is obtained.

In a case where the target reflection surface angle θ is set from this Formula, it can be seen that the distance X between the ink portion 14 and the camera unit 22*b* is determined as a function of the distance L between the light source unit 22*a* and the camera unit 22*b* according to the photographing distance D.

Figure 20:
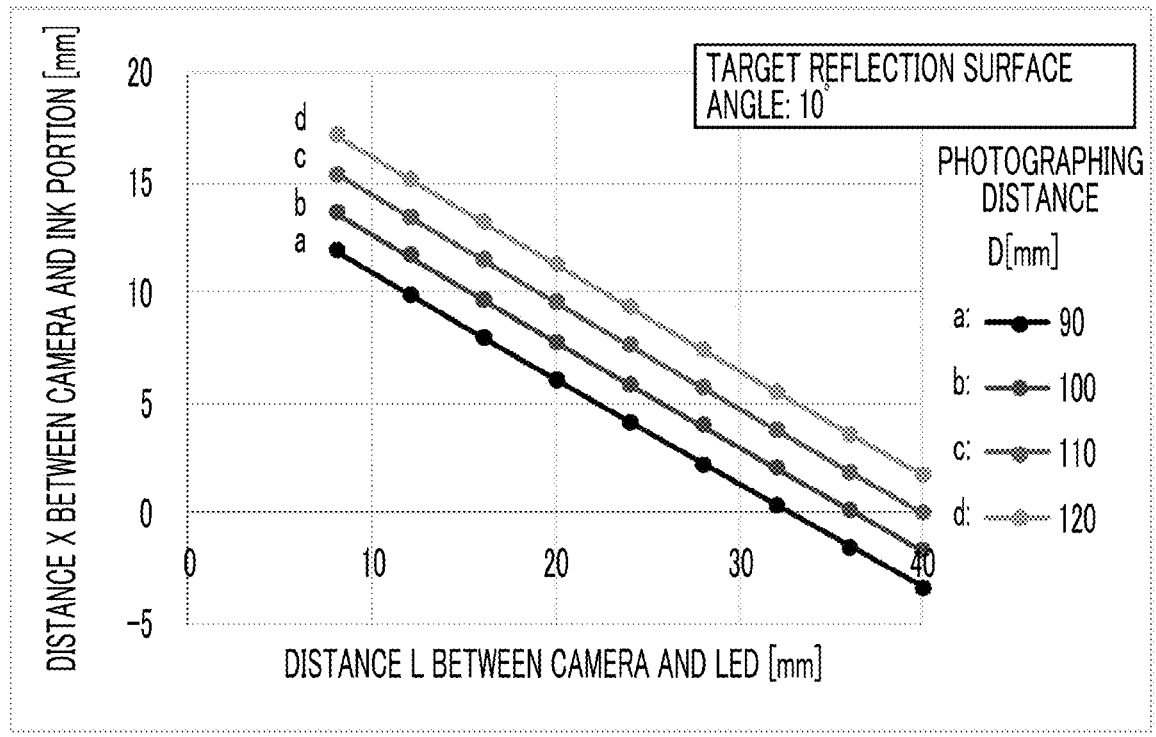
FIG. 20 is a graph showing a relationship between a distance D, a distance L, and a distance X of a second modified example.

FIG. 20 shows a graph of the distance X as the function of the distance L between the light source unit 22*a* and the camera unit 22*b* in a case where the target reflection surface angle is a desired value in a range of 6° to 15°, for example, 10°, and the photographing distance D is changed to 90 mm, 100 mm, 110 mm, and 120 mm. As the distance L increases, the distance X required to obtain the target reflection surface angle decreases linearly.

Therefore, in a case where the distance D is set to a desired value, the distance X required to obtain the target reflection surface angle is uniquely determined according to the distance L, and a guide may be displayed on the preview image 30 so that the distance X can be obtained.

Figure 21:
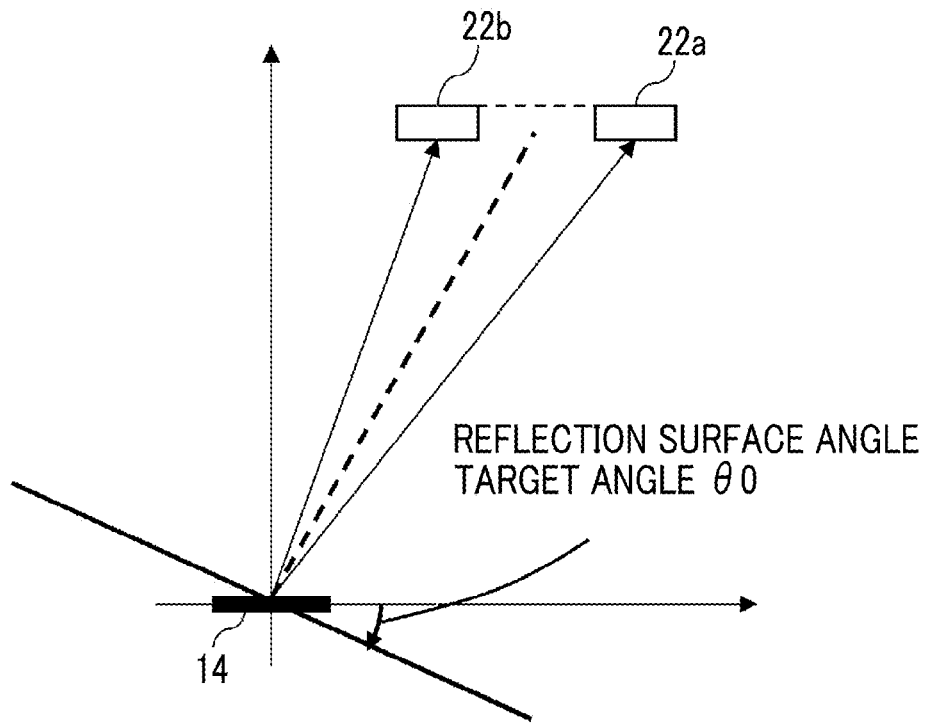
FIG. 21 is an explanatory diagram showing a positional relationship in a case where a distance L of a second modified example is standard.

FIG. 21 shows the positional relationship between the light source unit 22*a*, the ink portion 14, and the camera unit 22*b* in a case where the distance L between the light source unit 22*a* and the camera unit 22*b* is a standard value. In a case where the photographing distance D is a certain value, the target reflection surface angle θ is θ0 (for example, 10°), and the guide is displayed so that the distance X is obtained in which the reflection surface angle 60 is obtained.

Figure 22:
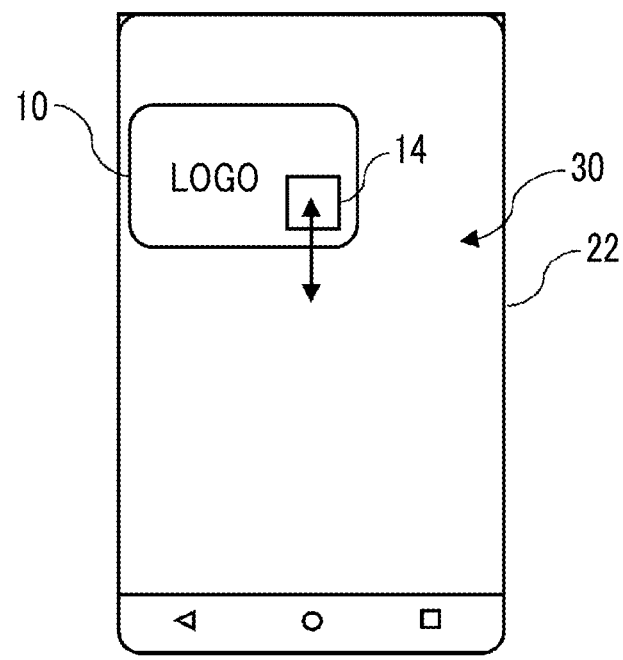
FIG. 22 is a schematic diagram showing an example of a preview image in a positional relationship of FIG. 21.

FIG. 22 shows an example of the preview image 30 of the collation image photographing machine 22 corresponding to the positional relationship of FIG. 21. The processor 22*c* displays the object 10 and a guide frame imitating the ink portion 14 on the preview image 30. Assuming that the image of the ink portion 14 is located in a center portion of the preview image 30 in a case where the camera unit 22*b* is located directly above the ink portion 14, as shown in FIG. 21, the guide frame is also displayed separated from the center portion of the preview image 30 by a distance according to the distance X so that the camera unit 22*b* photographs to be separated from directly above the ink portion 14 by the distance X. Then, the distance X is determined so that the target reflection surface angle 80 is obtained, and the user grasping the collation image photographing machine 22 visually recognizes the object 10 and the guide frame of the ink portion 14 displayed on the preview image 30 and adjusts the position of the collation image photographing machine 22 so that an actual image of the object 10 and the ink portion 14 displayed in the preview image matches the guide frame.

Figure 23:
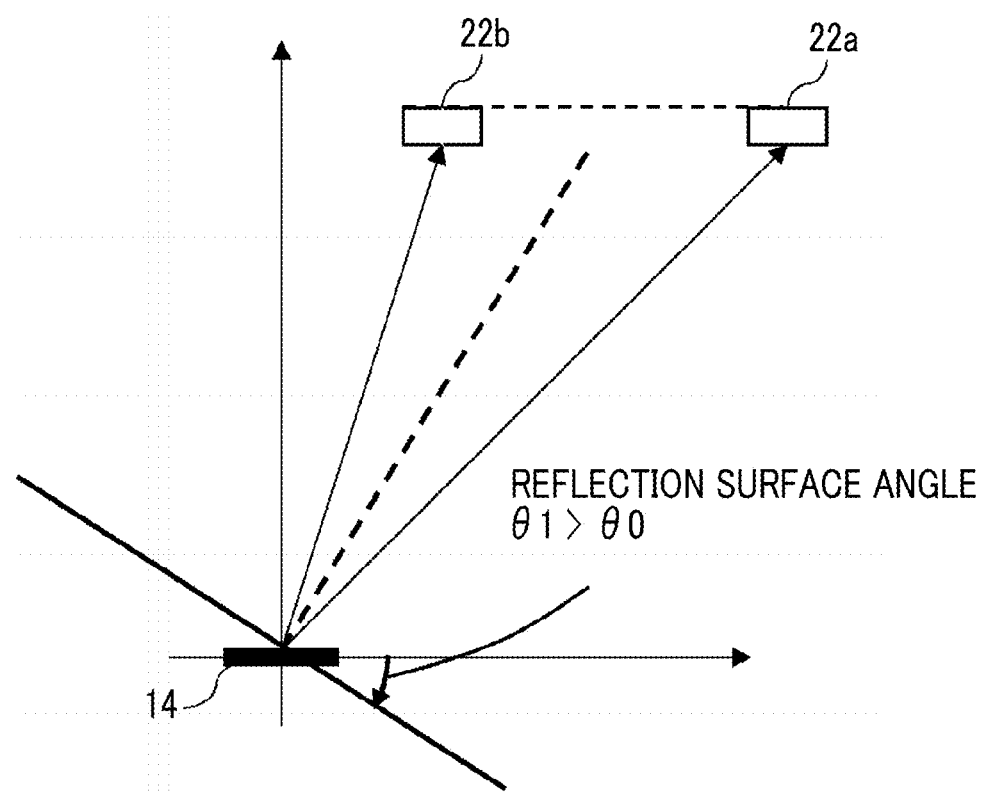
FIG. 23 is an explanatory diagram showing a positional relationship in a case where a distance L of a second modified example is larger than a standard.

FIG. 23 shows the positional relationship between the light source unit 22*a*, the ink portion 14, and the camera unit 22*b* in a case where the distance L between the light source unit 22*a* and the camera unit 22*b* is not standard, unlike FIG. 21, specifically in a case where the distance L is larger than the standard value. In a case where the guide frame is displayed as it is on the preview image 30 at a position shown in FIG. 22 in the positional relationship as shown in FIG. 23, the reflection surface angle θ1 in FIG. 23 is larger than the target reflection surface angle θ0, and θ1>θ0. An image with the reflection surface angle θ0, which has the same condition as the registered image, cannot be obtained, and as a result, the collation accuracy is lowered. In particular, in a case where a permissible range in which appropriate randomness can be obtained from the ink portion 14 is narrow (for example, in a case of a range of 8° to 12°), false determination of authenticity may occur due to a separation between the target reflection surface angles θ1 and θ0.

Therefore, in a case where the distance L is larger than the standard value, in order to adjust the distance X according to this difference, the position of the guide frame in the preview image 30 is adjusted from the position shown in FIG. 22. Specifically, in a case where the distance L is larger than in the case of FIG. 21, in order to make the distance X smaller than in the case of FIG. 21, the position of the guide frame in the preview image 30 is displayed at a position closer to the center portion of the preview image 30.

Figure 24:
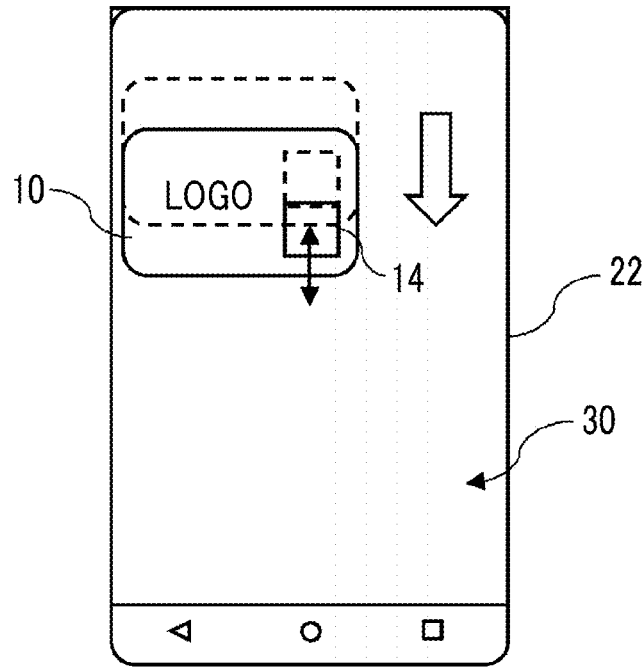
FIG. 24 is a schematic diagram showing an example of a preview image in a positional relationship of FIG. 23.

FIG. 24 shows an example of the preview image 30 of the collation image photographing machine 22 in the case. The processor 22*c* calculates the value of the distance X according to the distance L by calculation, and displays the guide frame at the position corresponding to the calculated distance X. In FIG. 24, the position of the guide frame in FIG. 22 is shown by a broken line for comparison. In a case where the position of the guide frame in FIG. 24, that is, the distance L is larger than the standard value, the position of the guide frame in FIG. 22, that is, the distance L is displayed at a position closer to the center portion of the preview image 30 (in the direction indicated by an arrow in the figure) than the position of the standard value. The user grasping the collation image photographing machine 22 adjusts the distance X by adjusting the position of the collation image photographing machine 22 according to the guide position shown in FIG. 24.

Figure 25:
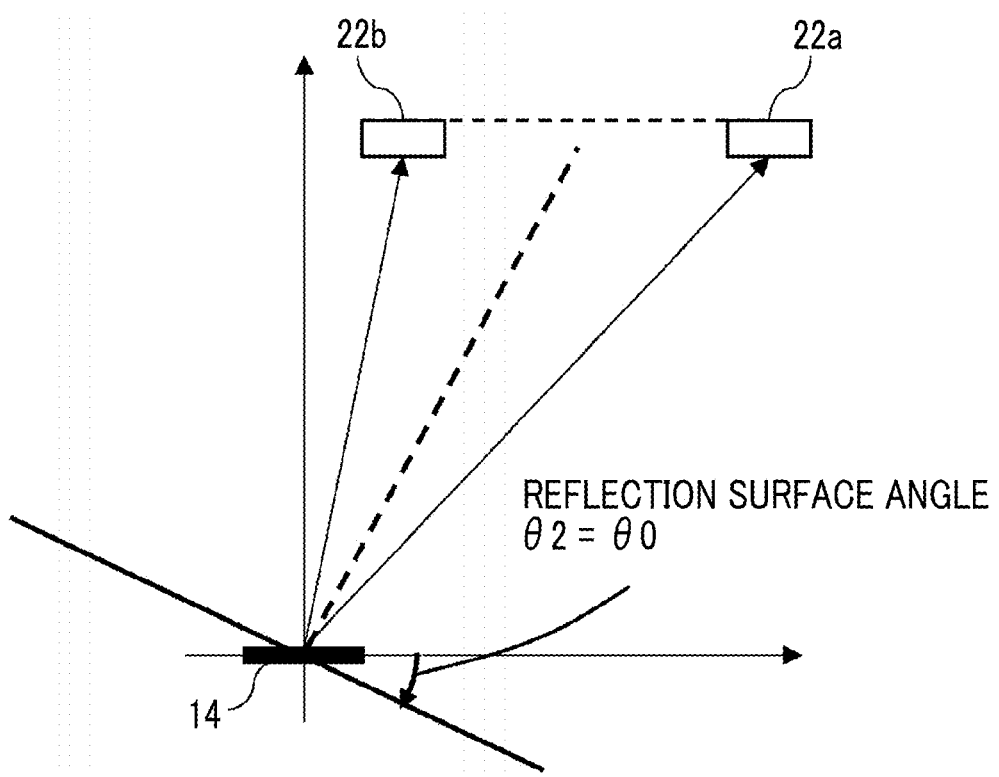
FIG. 25 is an explanatory diagram showing a positional relationship in a case where a distance X is adjusted according to a preview image of FIG. 24.

FIG. 25 shows a positional relationship between the light source unit 22*a*, the ink portion 14, and the camera unit 22*b* in a case where the position of the collation image photographing machine 22 is adjusted in this way. Even in a case where the distance L is larger than the standard value, a reflection surface angle θ2 can be made to match the target θ0 by adjusting the distance X to be shorter by that amount.

In FIGS. 24 and 25, the target reflection surface angle θ0 is achieved by adjusting the distance X shortly, but as is clear from the above formula, the target reflection surface angle θ0 can be achieved by adjusting the photographing distance D instead of the distance X.

Figure 26:
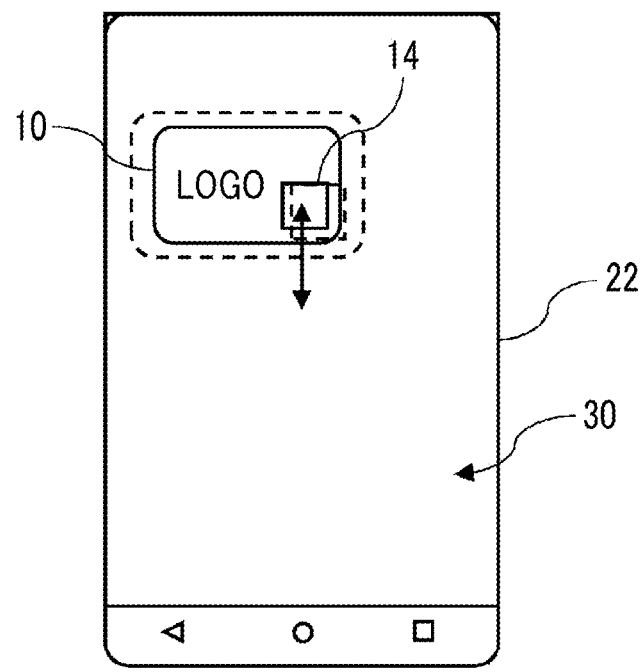
FIG. 26 is a schematic diagram showing another example of a preview image in a positional relationship of FIG. 23.

FIG. 26 shows an example of the preview image 30 in a case where the photographing distance D is adjusted. The processor 22*c* calculates the value of the photographing distance D according to the distance L by calculation, and displays the guide frame at the position corresponding to the calculated photographing distance D. In FIG. 26, the position of the guide frame in FIG. 22 is shown by a broken line for comparison. In a case where the position of the guide frame in FIG. 26, that is, the distance L is larger than the standard value, the position of the guide frame in FIG. 22, that is, the position where the distance L is the standard value is the same, but the size is reduced and displayed. The user grasping the collation image photographing machine 22 adjusts the distance D by adjusting the position of the collation image photographing machine 22 according to the guide position shown in FIG. 26.

Figure 27:
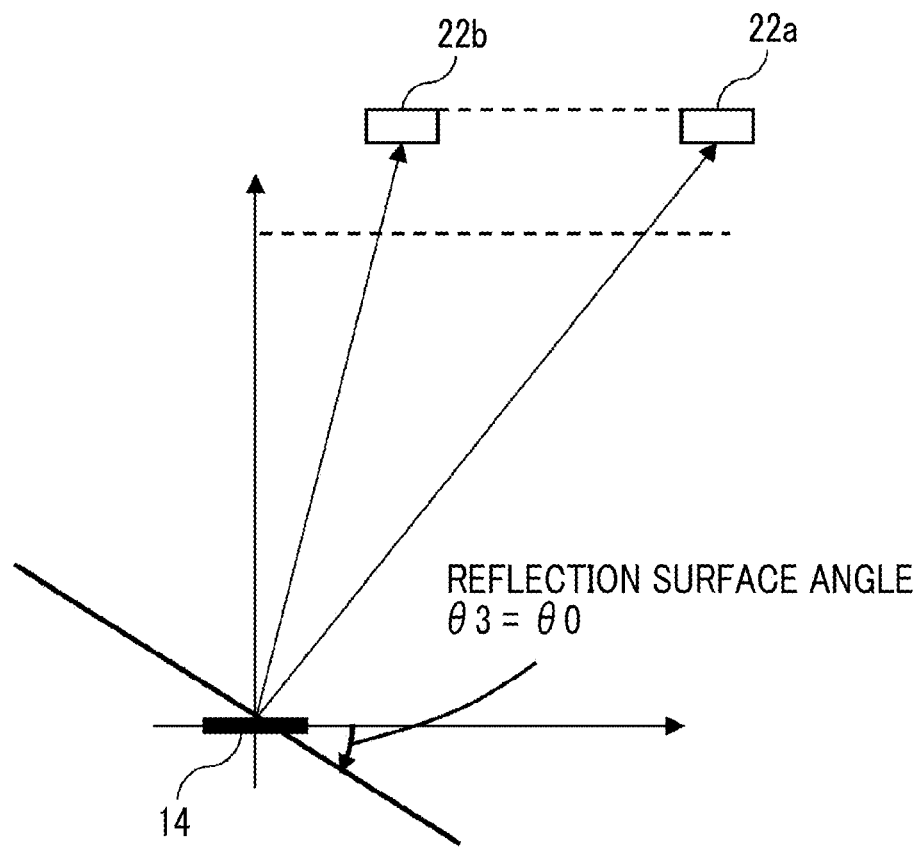
FIG. 27 is an explanatory diagram showing a positional relationship in a case where a distance D is adjusted according to a preview image of FIG. 26.

FIG. 27 shows a positional relationship between the light source unit 22*a*, the ink portion 14, and the camera unit 22*b* in a case where the position of the collation image photographing machine 22 is adjusted in this way. Even in a case where the distance L is larger than the standard value, a reflection surface angle θ3 can be matched with the target θ0 by adjusting the photographing distance D to be longer by that amount. In FIG. 27, the photographing distance D in the case of FIG. 21 is shown by a broken line for comparison.

As described above, even in a case where the distance L between the light source unit 22a and the camera unit 22b is different for each model of the collation image photographing machine 22 such as a smartphone, by changing the display mode of the guide frame in the preview image 30 according to the distance L, the user can easily photograph the ink portion 14 at the target reflection surface angle to collate with the registered image.

In the second modified example, the display position and the display size of the guide frame are changed as the display mode of the guide frame. However, in addition to changing either the display position or the display size, both the display position and the display size may be changed. Further, as the display mode of the guide frame, a guide by the text or the like may be added in addition to the display position and the display size. For example, the text such as "please move the image of the object to the center of the screen" and "please increase the distance to the object" are displayed. An arrow indicating an operation direction of the smartphone may be displayed.

In the second modified example, the display mode of the guide frame is changed according to the distance L between the light source unit 22a and the camera unit 22b, but the value of the distance L can be obtained by various methods.

For example, the processor 22c of the collation image photographing machine 22 may transmit model information to a cloud server via a communication line (including both a dedicated line and a public line) and receive set values (photographing resolution, distance L, and distance X) corresponding to the model information from the cloud server. The cloud server may be the server computer 50 in FIG. 1.

Alternatively, the processor 22c of the collation image photographing machine 22 may execute the installed collation application program, calculate the photographing resolution, the irradiation direction of light from the light source unit 22a, and the distance L by using distance measurement information by an AR function or the like, inclination information, focal length information of the camera unit 22b, or the like, and the image photographed by the user with the collation image photographing machine 22 to calculate the distance X by using these information.

Further, in the second modified example, since the bright spot portion 33 of the light from the light source unit 22a is not detected, it is not possible to display the guide 34 on the preview image 30 as shown in FIG. 13, and adjust the photographing posture of the collation image photographing machine 22 to match the bright spot portion 33 of light with the guide 34. However, as shown in FIG. 22 and the like, in a case where the image of the object 10 includes texts (LOGO), symbols, and the like, the photographing posture of the collation image photographing machine 22 can be adjusted with reference to an alignment direction of these texts and symbols. Of course, the processor 22c may detect the alignment direction of the texts and symbols, and may superimpose and display an arrow or the like indicating a direction of rotation to obtain a desired photographing posture on the preview image 30.

Third Modified Example

In the third modified example, even in a case where the distance L between the light source unit 22a and the camera unit 22b in the collation image photographing machine 22 is different for each model, the display position and display size of the guide displayed on the preview image 30 are changed so that the target reflection surface angle can be obtained. However, in a case where the user actually grasps the collation image photographing machine 22 such as a smartphone and photographs the object 10, it is assumed that the reflection surface angle may fluctuate due to camera shake or the like and deviate from the target reflection surface angle.

Therefore, in consideration of the deviation of the reflection surface angle due to the camera shake or the like of the user in this way, in addition to the change of the display mode of the guide shown in the second modified example, a plurality of registered images having different reflection surface angles may be photographed and registered in the registered image DB 50b of the server computer 50 to correspond to a variation range of the reflection surface angle due to the camera shake or the like.

That is, a first registered image photographed by the registration machine in advance assuming that the reflection surface angle is within a fixed range and a second registered image photographed by the registration machine in advance assuming that the reflection surface angle is within a range other than the range may be registered in the registered image DB 50b.

Figure 28:
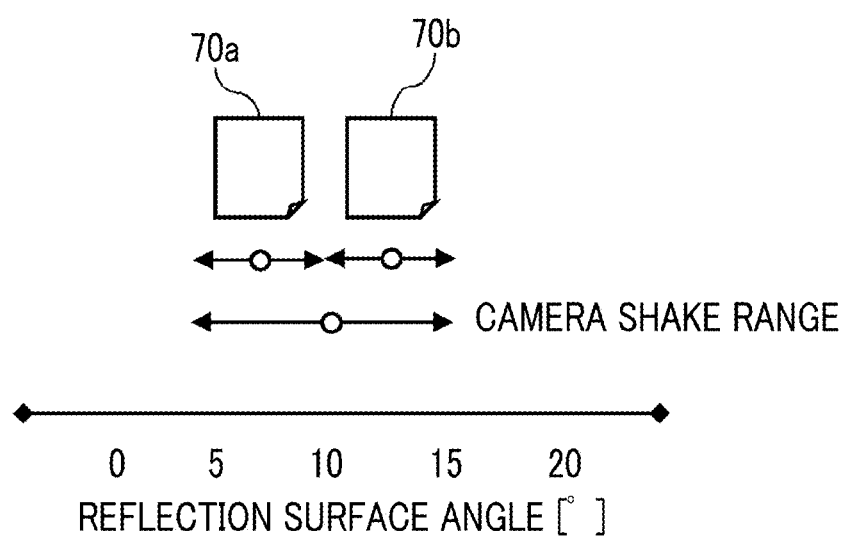
FIG. 28 is an explanatory diagram showing a relationship between a camera shake range and a plurality of registered images of a third modified example.

FIG. 28 schematically shows the relationship between the reflection surface angle and the registered image. It is assumed that the target reflection surface angle is, for example, 10°, and the variation range of the reflection surface angle at the time of actual photographing due to camera shake or the like is, for example, 10°±4°. At this time, by photographing the two registered images 70a and 70b, that are the registered image 70a which has a central reflection surface angle of 8° and can ensure collation accuracy within a range of ±2° and the registered image 70b which has a central reflection surface angle of 12° and can also ensure collation accuracy within a range of ±2° and registering the images in the registered image DB 50b, it is possible to correspond to the variation range of 10°±4° of the reflection surface angle. The collation image obtained by photographing is sequentially collated with the registered images 70a and 70b, and in a case where any of the above matches, the object 10 is determined to be true. In this case, assuming that the target reflection surface angle is shifted from 10° to 8°, the registered image 70a functions as the first registered image, and the registered image 70b functions as the second registered image. Of course, as the registered image, in addition to the first registered image and the second registered image, a third registered image may be further registered, and the second registered image in the direction in which the reflection surface angle is smaller than the first registered image and the third registered image in the direction in which the reflection surface angle is larger than the first registered image may be used.

In addition, the applicant of the present application confirmed that it is necessary to correspond to the angle variation of ±4° in order to cover the collation accuracy of 95%, and to correspond to the angle variation of ±2° in order to cover the collation accuracy of 68% in a case of photographing the ink portion 14 with a smartphone grasped by the user. In the modified example, the range of the reflection surface angle that can be handled by one registered image with respect to the ink portion 14 is about ±2°, but the number of required registered images can be adjusted according to the type of the ink portion 14.

It should be noted that the present disclosure includes the following matters.

Supplementary Notes (((1)))

A collation device including:
a light source unit;
a camera unit that receives light emitted from the light source unit and reflected in a collation area of an object to acquire a photographed image of the collation area; and
a processor configured to, by executing a program:
detect a positional relationship between the light source unit and the camera unit by using the photographed image; and
notify of a collation result between the photographed image and a registered image prepared in advance by using the positional relationship.

(((2)))

A collation device including:
a light source unit;
a camera unit that receives light emitted from the light source unit and reflected in a collation area of an object to acquire a photographed image of the collation area;
a display unit; and
a processor configured to, by executing a program:
display a guide providing an instruction for a positional relationship between a bright spot portion of the light source unit and the collation area in the photographed image on the display unit; and
notify of a collation result between a registered image prepared in advance in the same positional relationship as the positional relationship as instructed by the guide and the photographed image photographed in accordance with the guide.

(((3)))

The collation device according to (((1))), in which the processor is configured to:
detect a bright spot portion of the light source unit or brightness distribution of the photographed image, included in the photographed image, and
detect the positional relationship between the light source unit and the camera unit by using the bright spot portion or the brightness distribution.

(((4)))

The collation device according to (((2))), in which the processor is configured to:
display the guide on the display unit in a case where a surface on which the light source unit and the camera unit are mounted and a surface of the collation area are substantially parallel.

(((5)))

The collation device according to (((4))), in which the processor is configured to:
display the guide on the display unit so that a projection position of the light source unit, the collation area, and the bright spot portion are positioned on a straight line in a case where the light source unit is projected onto the surface of the collation area.

(((6)))

The collation device according to (((4))), in which the processor is configured to:
display the guide on the display unit so that a projection position of the light source unit, the collation area, and the bright spot portion have a specific positional relationship on a non-straight line in a case where the light source unit is projected onto the surface of the collation area.

(((7)))

The collation device according to (((2))) or (((4))), in which the processor is configured to:
display, as a first collation, the guide on the display unit so that a projection position of the light source unit, the collation area, and the bright spot portion are positioned on a straight line in a case where the light source unit is projected onto a surface of the collation area, and
display, as an additional collation, the guide on the display unit so that the projection position of the light source unit, the collation area, and the bright spot portion have a specific positional relationship on a straight line or non-straight line in a case where the light source unit is projected onto the surface of the collation area.

(((8)))

The collation device according to (((2))) or (((4))), in which the processor is configured to:
acquire a plurality of photographed images, and
display the guide on the display unit so that a projection position of the light source unit, the collation area, and the bright spot portion have a different positional relationship at a time of acquiring each photographed image.

(((9)))

The collation device according to (((4))), in which the processor is configured to:
detect that the surface on which the light source unit and the camera unit are mounted and the surface of the collation area are substantially parallel by using the photographed image.

(((10)))

The collation device according to (((4))), in which the processor is configured to:
display an angle guide on the display unit so that the surface on which the light source unit and the camera unit are mounted and the surface of the collation area are parallel in a case where the surfaces are not substantially parallel.

(((11)))

The collation device according to (((1))) or (((2))),
in which the registered image is an image photographed by a registration machine in advance assuming that a distance between the light source unit and the camera unit is within a predetermined range.

(((12)))

The collation device according to (((1))) or (((2))),
in which the registered image includes a first image photographed by a registration machine in advance assuming that a distance between the light source unit and the camera unit is within a predetermined range and a second image photographed by the registration machine in advance assuming that the distance is within a range other than the range.

(((13)))

The collation device according to any one of (((1))) to (((12))),
in which the collation area is formed by randomly dispersing bright bodies in ink, and
the processor is configured to:
collate the photographed image with the registered image, and notify that the object is genuine in a case where a degree of similarity between both the images is equal to or higher than a fixed value.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A collation device comprising:
a light source unit;
a camera unit that receives light emitted from the light source unit and reflected in a collation area of an object to acquire a photographed image of the collation area; and
a processor configured to, by executing a program:
detect a bright spot portion of the light emitted from the light source unit from the photographed image obtained from the camera unit;
detect a distance between the light source unit and the camera unit by using a position of the bright spot portion from the photographed image;
detect a positional relationship between among the light source unit, the camera unit, and the collation area in the photographed image according to the distance between the light source unit and the camera unit; and
notify of a collation result between the photographed image and a registered image prepared in advance by using the positional relationship.

2. A collation device comprising:
a light source unit;
a camera unit that receives light emitted from the light source unit and reflected in a collation area of an object to acquire a photographed image of the collation area;
a display unit; and
a processor configured to, by executing a program:
detect a distance between the light source unit and the camera unit by using the photographed image;
display a guide providing an instruction for a positional relationship among the light source unit, the camera unit, and the collation area in the photographed image on the display unit according to the distance between the light source and the camera unit; and
notify of a collation result between a registered image prepared in advance in the same positional relationship as the positional relationship as instructed by the guide and the photographed image photographed in accordance with the guide.

3. The collation device according to claim 2, wherein the processor is configured to:
display a guide providing an instruction for a positional relationship between a bright spot portion of the light source unit and the collation area in the photographed image on the display unit.

4. The collation device according to claim 1, wherein the processor is configured to:
detect a bright spot portion of the light source unit or brightness distribution of the photographed image, included in the photographed image, and
detect the positional relationship between the light source unit and the camera unit by using the bright spot portion or the brightness distribution.

5. The collation device according to claim 3, wherein the processor is configured to:
display the guide on the display unit in a case where a surface on which the light source unit and the camera unit are mounted and a surface of the collation area are substantially parallel.

6. The collation device according to claim 5, wherein the processor is configured to:
display the guide on the display unit so that a projection position of the light source unit, the collation area, and the bright spot portion are positioned on a straight line in a case where the light source unit is projected onto the surface of the collation area.

7. The collation device according to claim 5, wherein the processor is configured to:
display the guide on the display unit so that a projection position of the light source unit, the collation area, and the bright spot portion have a specific positional relationship on a non-straight line in a case where the light source unit is projected onto the surface of the collation area.

8. The collation device according to claim 3, wherein the processor is configured to:
display, as a first collation, the guide on the display unit so that a projection position of the light source unit, the collation area, and the bright spot portion are positioned on a straight line in a case where the light source unit is projected onto a surface of the collation area, and
display, as an additional collation, the guide on the display unit so that the projection position of the light source unit, the collation area, and the bright spot portion have a specific positional relationship on a straight line or a non-straight line in a case where the light source unit is projected onto the surface of the collation area.

9. The collation device according to claim 3, wherein the processor is configured to:
acquire a plurality of photographed images, and
display the guide on the display unit so that a projection position of the light source unit, the collation area, and the bright spot portion have a different positional relationship at a time of acquiring each photographed image.

10. The collation device according to claim 5, wherein the processor is configured to:
detect that the surface on which the light source unit and the camera unit are mounted and the surface of the collation area are substantially parallel by using the photographed image.

11. The collation device according to claim 5, wherein the processor is configured to:
display an angle guide on the display unit so that the surface on which the light source unit and the camera unit are mounted and the surface of the collation area are parallel in a case where the surfaces are not substantially parallel.

12. The collation device according to claim 1,
wherein the registered image is an image photographed by a registration machine in advance assuming that a distance between the light source unit and the camera unit is within a predetermined range.

13. The collation device according to claim 1,
wherein the registered image includes a first image photographed by a registration machine in advance assuming that a distance between the light source unit and the camera unit is within a predetermined range and a second image photographed by the registration machine in advance assuming that the distance is within a range other than the range.

14. The collation device according to claim 2, wherein the processor is configured to:
display the guide on the display unit, and change a display mode of the guide according to a distance between the light source unit and the camera unit.

15. The collation device according to claim 14, wherein the processor is configured to:
change, in a case where the distance between the light source unit and the camera unit is different from a predetermined distance, at least one of a display position or a display size of the guide in a case where the distances are the same.

16. The collation device according to claim 15, wherein the processor is configured to:
change, in a case where the distance between the light source unit and the camera unit is larger than the predetermined distance, the display position of the guide to a position closer to an image center of the display unit than the display position in a case where the distances are the same.

17. The collation device according to claim 15, wherein the processor is configured to:
change, in a case where the distance between the light source unit and the camera unit is larger than the predetermined distance, the display size to a size smaller than the display size in a case where the distances are the same.

18. The collation device according to claim 14,
wherein the registered image includes a first image photographed by a registration machine in advance assuming that a reflection surface angle of light in a case where the light from the light source is emitted to the collation area, reflected in the collation area, and incident on the camera unit is within a fixed range, and a second image registered in advance by the registration machine assuming that the reflection surface angle is within a range other than the range.

19. The collation device according to claim 1,
wherein the collation area is formed by randomly dispersing bright bodies in ink, and
the processor is configured to:
collate the photographed image with the registered image, and notify that the object is genuine in a case where a degree of similarity between both the images is equal to or higher than a fixed value.

20. A non-transitory computer readable medium storing a program causing a computer processor to execute a process comprising:
receiving light emitted from a light source unit and reflected in a collation area of an object by a camera unit to acquire a photographed image of the collation area;
detecting a bright spot portion of the light emitted from the light source unit from the photographed image obtained from the camera unit;
detecting a distance between the light source unit and the camera unit by using a position of the bright spot portion from the photographed image;
detecting a positional relationship among the light source unit, the camera unit, and the collation area in the photographed image according to the distance between the light source and the camera unit; and
notifying of a collation result between the photographed image and a registered image prepared in advance by using the positional relationship.

21. A non-transitory computer readable medium storing a program causing a computer processor to execute a process comprising:
receiving light emitted from a light source unit and reflected in a collation area of an object by a camera unit to acquire a photographed image of the collation area;
detecting a distance between the light source unit and the camera unit by using the photographed image;
displaying a guide providing an instruction for a positional relationship among the light source unit, the camera unit, and the collation area in the photographed image on a display unit according to the distance between the light source and the camera unit; and
notifying of a collation result between a registered image prepared in advance in the same positional relationship as the positional relationship as instructed by the guide and
the photographed image photographed in accordance with the guide.

* * * * *